United States Patent
Zhang et al.

(10) Patent No.: US 11,146,510 B2
(45) Date of Patent: Oct. 12, 2021

(54) COMMUNICATION METHODS AND APPARATUSES

(71) Applicant: Alibaba Group Holding Limited, Grand Cayman (KY)

(72) Inventors: Lili Zhang, Zhejiang (CN); Di Zhang, Zhejiang (CN); Yongqiang Pan, Zhejiang (CN); Weinan He, Zhejiang (CN); Daping Zhang, Zhejiang (CN); Jianjun Zhao, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 129 days.

(21) Appl. No.: 16/577,926

(22) Filed: Sep. 20, 2019

(65) Prior Publication Data
US 2020/0021542 A1    Jan. 16, 2020

Related U.S. Application Data

(63) Continuation of application No. PCT/CN2018/078669, filed on Mar. 12, 2018.

(30) Foreign Application Priority Data

Mar. 21, 2017  (CN) .......................... 201710169947.9

(51) Int. Cl.
*H04L 12/58* (2006.01)
*G06F 16/332* (2019.01)
(Continued)

(52) U.S. Cl.
CPC ............ *H04L 51/04* (2013.01); *G06F 16/338* (2019.01); *G06F 16/3322* (2019.01);
(Continued)

(58) Field of Classification Search
CPC combination set(s) only.
See application file for complete search history.

(56) References Cited

U.S. PATENT DOCUMENTS 8,255,810 B2 * 8/2012 Moore ................ G06F 3/04817
715/752
8,457,043 B2  6/2013 Gromoll et al.
(Continued)

FOREIGN PATENT DOCUMENTS

CN    102194005    9/2011
CN    102946344    2/2013
(Continued)

OTHER PUBLICATIONS

English Translation of CN 1st Office Action for corresponding U.S. Appl. No. 16/577,926, dated Jun. 1, 2020.

*Primary Examiner* — Philip J Chea
*Assistant Examiner* — Mohammed Ahmed
(74) *Attorney, Agent, or Firm* — Lee & Hayes, P.C.

(57) ABSTRACT

Communication methods and apparatuses are provided. A method may include: obtaining at least a part of a communication message in a communication session page of a communication application, the communication session page being used for conducting communications between an end user and at least one peer user; performing content recognition of the communication message; and configuring a to-be-sent message corresponding to a message sending control in the communication session page, so that the to-be-sent message matches a content recognition result for the communication message. Using the technical solutions of the present disclosure, the efficiency of communications can be improved.

20 Claims, 27 Drawing Sheets

(51) Int. Cl.
  *G06F 16/338* (2019.01)
  *G06F 40/274* (2020.01)
  *H04M 1/7243* (2021.01)
  *G06F 40/279* (2020.01)
  *G06F 40/30* (2020.01)
  *G06F 3/0484* (2013.01)

(52) U.S. Cl.
  CPC ........ *G06F 16/3329* (2019.01); *G06F 40/274* (2020.01); *H04M 1/7243* (2021.01); *G06F 3/04842* (2013.01); *G06F 40/279* (2020.01); *G06F 40/30* (2020.01)

(56) References Cited

U.S. PATENT DOCUMENTS

| | | | |
|---|---|---|---|
| 8,989,713 | B2 | 3/2015 | Doulton |
| 9,911,144 | B1 | 3/2018 | Sheinberg et al. |
| 10,015,318 | B2 | 7/2018 | Landers et al. |
| 10,708,216 | B1* | 7/2020 | Rao ................ G06Q 50/01 |
| 2005/0060643 | A1 | 3/2005 | Glass et al. |
| 2007/0271340 | A1* | 11/2007 | Goodman ............ G06Q 10/107 709/206 |
| 2011/0264527 | A1 | 10/2011 | Fitzpatrick et al. |
| 2012/0205436 | A1 | 8/2012 | Thomas et al. |
| 2013/0191250 | A1 | 7/2013 | Bradley et al. |
| 2013/0191394 | A1 | 7/2013 | Bradley et al. |
| 2013/0198004 | A1 | 8/2013 | Bradley et al. |
| 2013/0262598 | A1 | 10/2013 | Makanawala et al. |
| 2013/0290106 | A1 | 10/2013 | Bradley et al. |
| 2014/0058812 | A1 | 2/2014 | Bender et al. |
| 2014/0122220 | A1 | 5/2014 | Bradley et al. |
| 2015/0100537 | A1* | 4/2015 | Grieves ................ G06F 3/0237 706/52 |
| 2015/0188861 | A1* | 7/2015 | Esplin ................ H04L 51/02 709/206 |
| 2015/0195226 | A1* | 7/2015 | McDowell-White ............ H04L 51/08 715/752 |
| 2015/0213371 | A1 | 7/2015 | Nitz et al. |
| 2015/0288533 | A1* | 10/2015 | Zhang ................ H04L 12/2818 709/217 |
| 2015/0356468 | A1* | 12/2015 | Cummins ............ H04L 51/046 705/5 |
| 2016/0164815 | A1* | 6/2016 | Cho ........................ H04L 51/04 709/206 |
| 2016/0239165 | A1* | 8/2016 | Chen ........................ H04L 51/24 |
| 2016/0241500 | A1* | 8/2016 | Bostick ................ H04L 51/10 |
| 2017/0041272 | A1* | 2/2017 | Chang ................ G06F 3/0488 |
| 2017/0075878 | A1* | 3/2017 | Jon ................ H04M 1/72436 |
| 2017/0147202 | A1* | 5/2017 | Donohue ............ G06F 3/04886 |
| 2017/0177554 | A1* | 6/2017 | Emmons ................ H04L 51/063 |
| 2017/0180276 | A1* | 6/2017 | Gershony ............... H04L 51/02 |
| 2017/0222961 | A1* | 8/2017 | Beach ..................... H04L 51/02 |
| 2017/0249291 | A1* | 8/2017 | Patel ..................... G06F 40/274 |
| 2017/0257338 | A1* | 9/2017 | Zhang ................... H04L 51/04 |
| 2017/0264582 | A1* | 9/2017 | Chase ................... G06F 3/04845 |
| 2017/0308290 | A1* | 10/2017 | Patel ..................... G06F 3/04817 |
| 2017/0344224 | A1* | 11/2017 | Kay ..................... G06F 40/205 |
| 2017/0371522 | A1* | 12/2017 | Martinez del Corral .................... G06F 3/04842 |
| 2018/0024991 | A1* | 1/2018 | Baldwin ................ H04L 51/36 704/9 |
| 2018/0063042 | A1* | 3/2018 | Dunne ................ H04L 65/403 |
| 2018/0097755 | A1* | 4/2018 | Mody ................... H04L 51/046 |
| 2018/0210874 | A1* | 7/2018 | Fuxman ................ G06F 40/35 |
| 2018/0309706 | A1* | 10/2018 | Kim ................ H04M 1/72439 |
| 2018/0324121 | A1* | 11/2018 | Zhang ..................... H04L 51/08 |
| 2018/0356957 | A1* | 12/2018 | Desjardins ............ G06F 40/279 |
| 2020/0021542 | A1* | 1/2020 | Zhang ................... H04L 51/18 |

FOREIGN PATENT DOCUMENTS

| | | |
|---|---|---|
| CN | 105959474 | 9/2016 |
| CN | 106453047 | 2/2017 |
| EP | 3091445 | 11/2016 |

* cited by examiner

COMMUNICATION METHODS AND APPARATUSES

CROSS REFERENCE TO RELATED PATENT APPLICATIONS

This application claims priority to and is a continuation of PCT Patent Application No. PCT/CN2018/078669 filed on 12 Mar. 2018, and is related to and claims priority to Chinese Application No. 201710169947.9, filed on 21 Mar. 2017 and entitled "Communication Methods and Apparatuses," which are incorporated herein by reference in their entirety.

TECHNICAL FIELD

The present disclosure relates to the technical field of communications, and particularly to communication methods and apparatuses.

BACKGROUND

In related technologies, mobile enterprise office platforms have been widely used in work processes of various groups such as enterprises, educational institutions, government agencies, etc., which can not only improve the efficiency of communications between users and reduce communication costs, but can also effectively improve users' event processing efficiency and work efficiency.

However, in a communication function provided by a mobile enterprise office platform, a user needs to manually input a communication message in an input box provided in a communication session page corresponding to a communication session, which results in a low efficiency of communications.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Accordingly, the present disclosure provides communication methods and apparatuses, which can improve the efficiency of communications.

To achieve the above objectives, the present disclosure provides the following technical solutions.

In implementations, a communication method is proposed, which includes:

obtaining at least a part of a communication message in a communication session page of a communication application, the communication session page being used for conducting communications between an end user and at least one peer user;

performing content recognition of the obtained communication message; and configuring a to-be-sent message corresponding to a message sending control in the communication session page, so that the to-be-sent message matches a content recognition result for the communication message.

In implementations, a communication method is provided, which includes:

displaying a quick sending control in a communication session page of an end user and at least one peer user that is based on an communication application;

randomly generating a quick message corresponding to the quick sending control in response to detecting a triggering operation of the quick sending control; and quickly sending the generated quick message through the communication session page.

In implementations, a communication apparatus is provided, which includes:

a first acquisition unit that obtains at least a part of a communication message in a communication session page of a communication application, the communication session page being used for conducting communications between an end user and at least one peer user;

a recognition unit that performs content recognition of the obtained communication message; and a configuration unit that configures a to-be-sent message corresponding to a message sending control in the communication session page, so that the to-be-sent message matches a content recognition result for the communication message.

In implementations, a communication apparatus is provided, which includes:

a display unit that displays a quick sending control in a communication session page of an end user and at least one peer user based on a communication application;

a generation unit that randomly generates a quick message corresponding to the quick sending control in response to detecting a triggering operation of the quick sending control;

a sending unit that quickly sends the generated quick message through the communication session page.

As can be seen from the above technical solutions, by performing content recognition on a communication message in a communication session page, the present disclosure configures a to-be-sent message corresponding to a message sending control, so that an end user only needs to trigger the message sending control in order to send the to-be-sent message similar to the above communication message without the need of the end user to perform a manual input, thus helping to improve the efficiency of communications.

DETAILED DESCRIPTION

Figure 1:
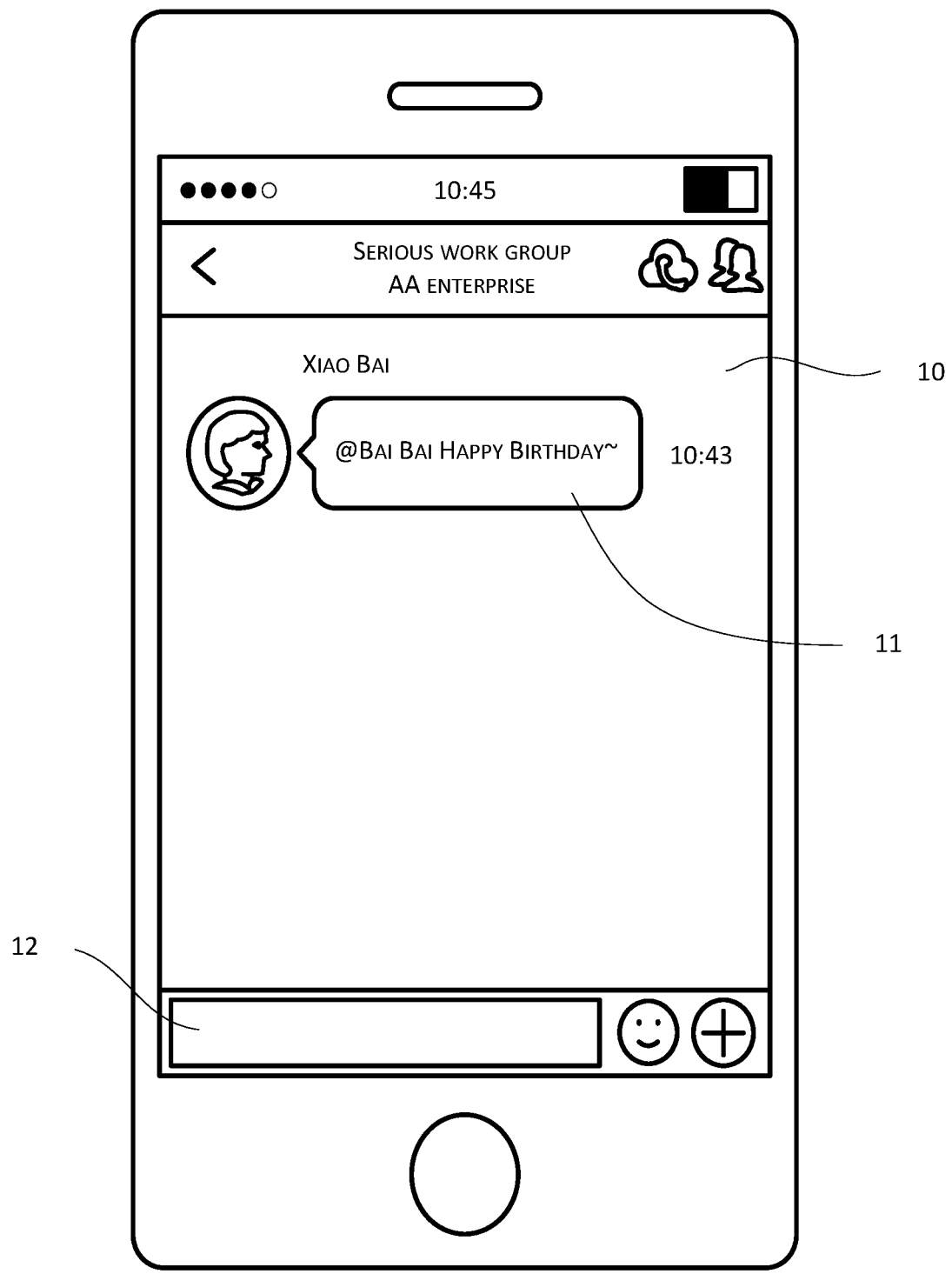
FIGS. 1, 2, and 3A-3B are schematic diagrams of a communication session page in the related technologies.

FIG. 1 is a schematic diagram of a communication session page in the related technologies. As shown in FIG. 1, an electronic device is assumed to display a communication session page 10 corresponding to a group "serious work group" in a mobile enterprise office platform. The communication session page 10 can display communication messages sent by each group member, such as a communication message 11 (such as "@Bai Bai Happy Birthday") sent by a group member "Xiao Bai". Apparently, the group member "Xiao Bai" conveys a birthday blessing to another group member "Bai Bai" through the above communication message. Then, for an end user, when the above communication message sent by the group member "Xiao Bai" is viewed, a similar communication message may need to be sent to the group member "Bai Bai" in the communication session page 10 to express a corresponding Birthday blessing.

Figure 2:
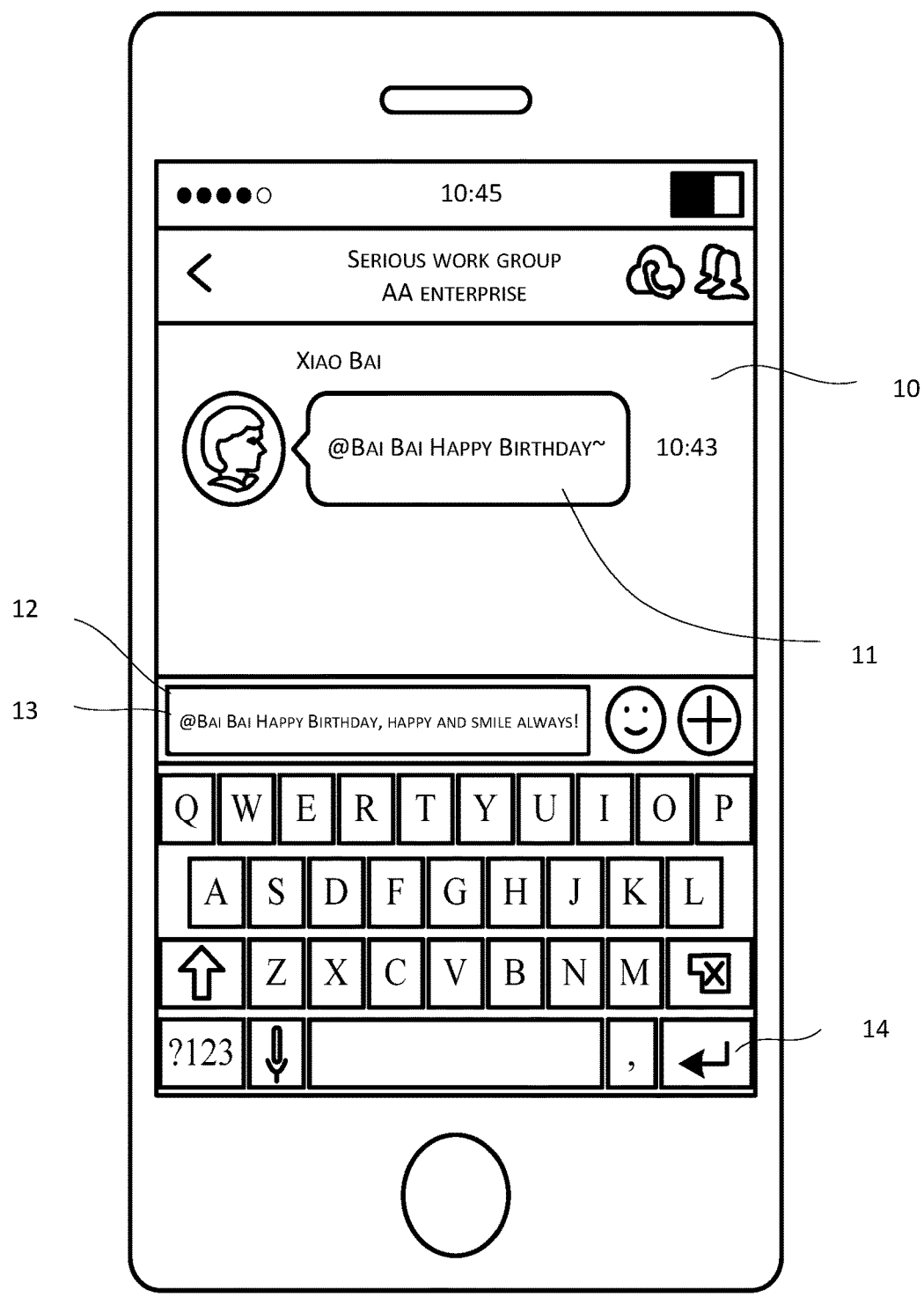

In the related technologies, the end user needs to trigger an input box 12 in the communication session page 10, manually inputs manual input content 13 (such as "@Bai Bai Happy Birthday, happy and smile always!") as shown in FIG. 2 in the input box, and, sends a communication message containing the manual input content 13 in the communication session page 10 by triggering a sending control 14.

In fact, the content of the message sent by the end user and the group member "Xiao Bai" is very similar. However, the end user still needs to manually edit the message content, which is not only cumbersome, but also prone to input errors, which lead to repeated inputs, and result in a reduction in the efficiency of communications. Apparently, the end user can also copy the communication message 11 sent by the group member "Xiao Bai" to avoid a manual input by the end user. However, the copied message content is still needed to be pasted into the input box 12, and a sending operation is completed by triggering the sending control 14.

Figure 3A:
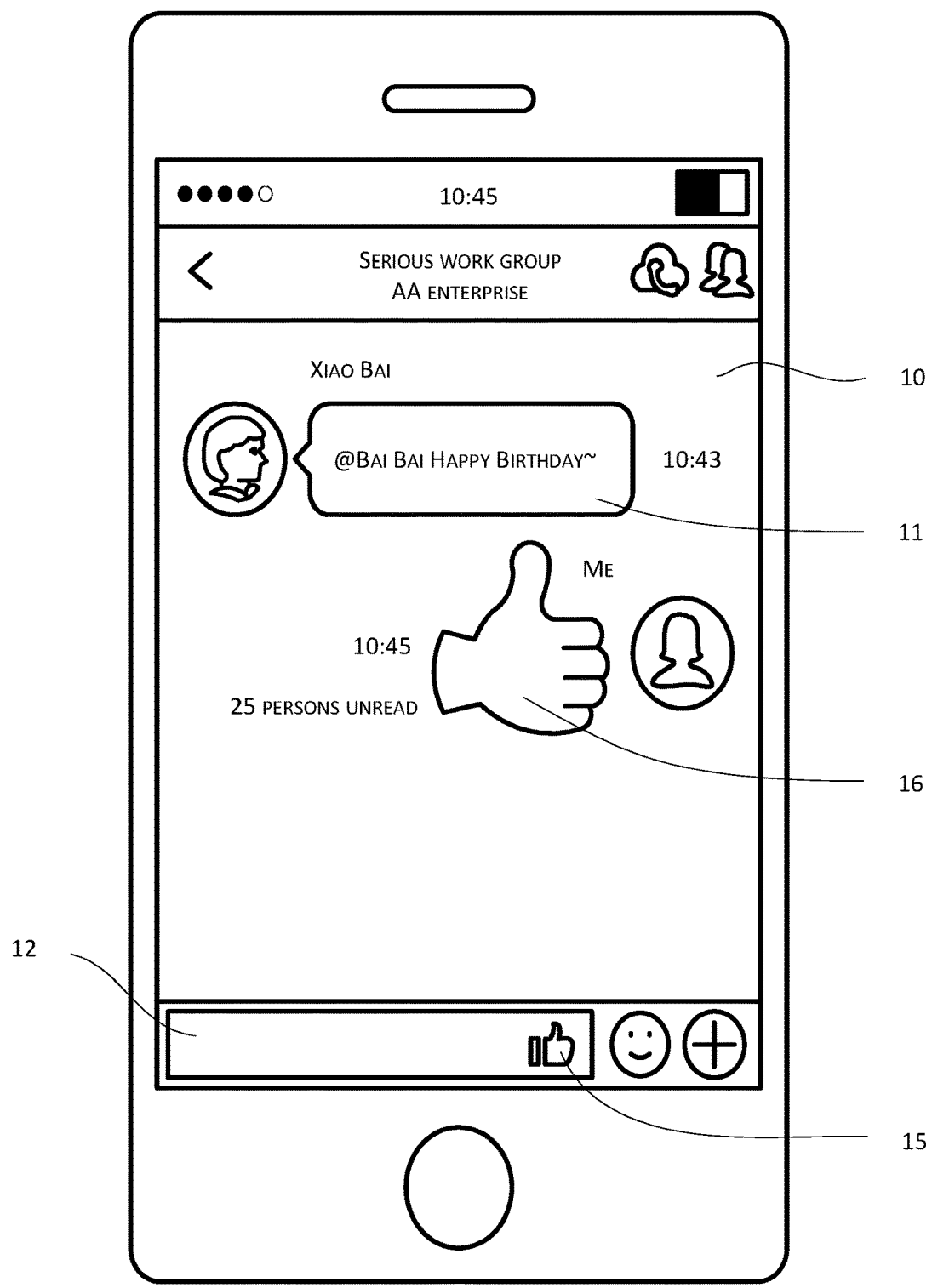
Figure 3B:
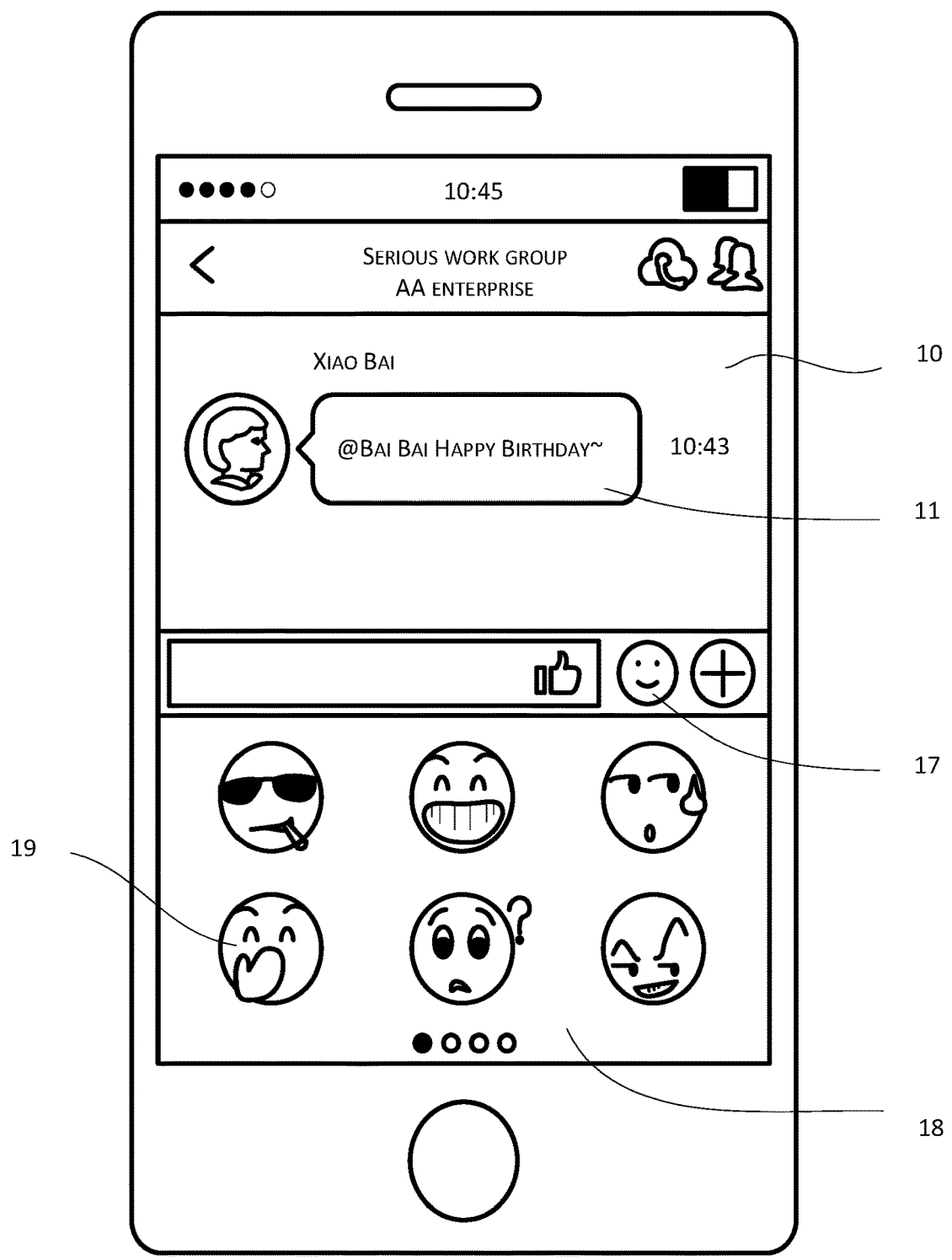

In the related technologies, a relatively simplified way of transmitting a communication message exists. For example, as shown in FIG. 3A, by displaying a quick sending control 15 in the input box 12, the end user only needs to trigger the quick sending control 15 to send a predefined quick message 16 in the communication session page 10 without the need of calling the input box 12 and manually inputting the corresponding message content by the end user. For example, as shown in FIG. 3B, the end user can call a corresponding expression selection interface 18 by triggering an expression selection control 17. The expression selection interface 18 includes a plurality of predefined expression icons 19, so that the end user can select and send these expression icons 19. However, based on the quick sending control 15 as shown in FIG. 3A above, and the expression selection control 17 as shown in FIG. 3B, etc., only predefined fixed message content (for example, a "like" gesture icon as shown in FIG. 3A, and expression icons 19 as shown in FIG. 3B) can be sent, which cannot be applied to all communication session scenarios.

Figure 4:
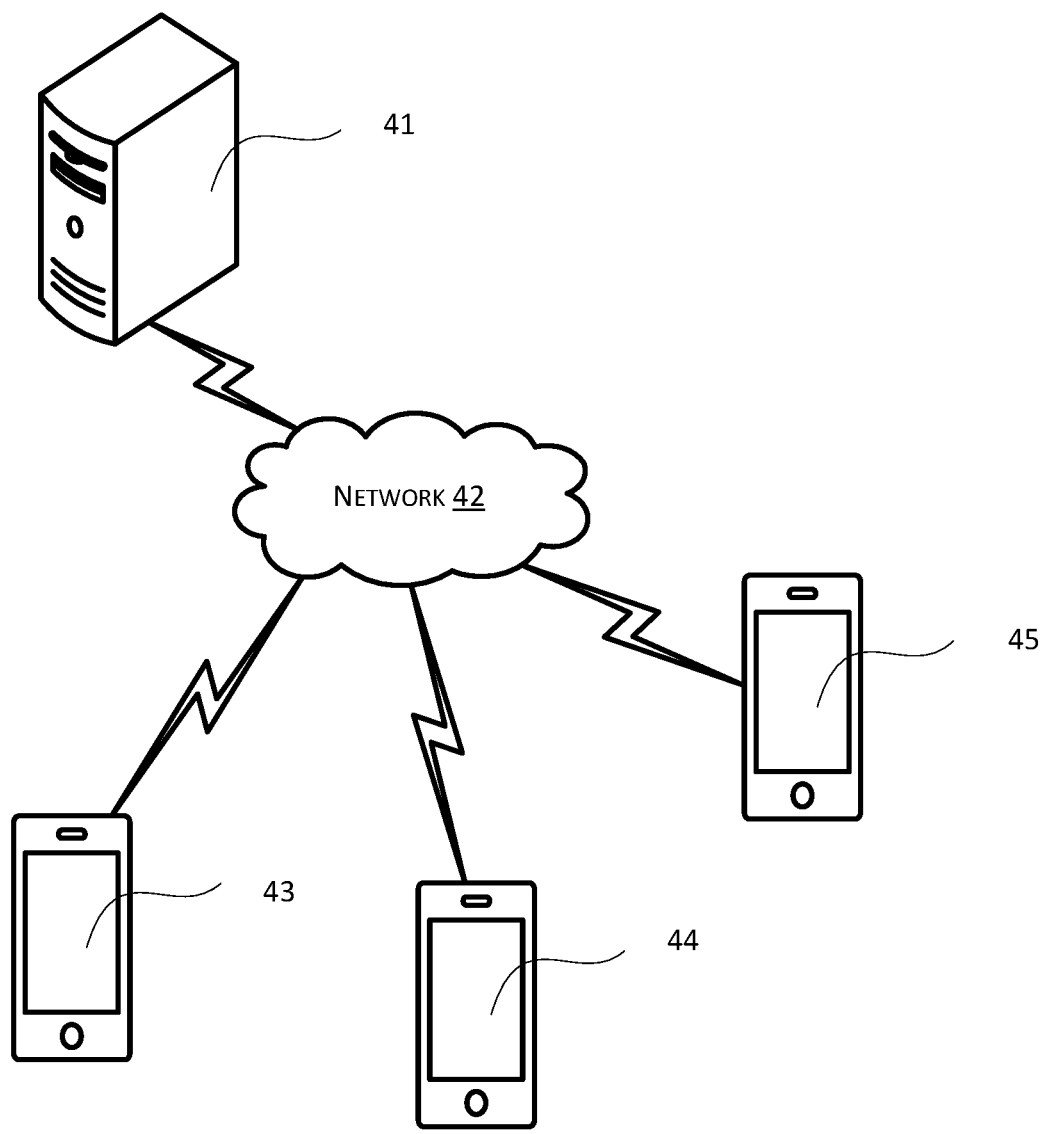
FIG. 4 is a schematic structural diagram of a communication system according to an exemplary embodiment of the present disclosure.

Therefore, the present disclosure solves the above-mentioned technical problems existing in the related technologies by proposing new communication solutions. FIG. 4 is a schematic structural diagram of a communication system according to an exemplary embodiment of the present disclosure. The communication system may be used to implement the communication solutions of the present disclosure. As shown in FIG. 4, the system may include a server 41, a network 42, and a plurality of electronic devices, such as a mobile phone 43, a mobile phone 44, and a mobile phone 45, etc.

The server 41 may be a physical server including a separate host. Alternatively, the server 41 may be a virtual server hosted by a host cluster. Alternatively, the server 41 may be a cloud server. During operation, the server 41 can run a server-side program of a certain application to implement related service functions of the application. For example, when the server 41 runs a program of a mobile group office platform, a server end of the mobile group office platform can be implemented. In the technical solutions of the present disclosure, the server 41 can cooperate with client ends of the mobile group office platform running on the mobile phones 43-45 to implement the communication solutions of the present disclosure.

The mobile phones 43-45 are just one type of electronic devices that users can use. In practice, users obviously can also use electronic devices such as tablet devices, notebook computers, PDAs (Personal Digital Assistants), wearable devices (such as smart glasses, smart watches, etc.), etc., which are not limited by the present disclosure. During operation, the electronic device can run a client-side program of a certain application to implement related services functions of the application. For example, when the electronic device runs a program of a mobile group office platform, a client end of the mobile group office platform can be implemented.

A network 42 through which the mobile phones 43-45 and the server 41 interact may include multiple types of wired or wireless networks. In an embodiment, the network 42 may include a Public Switched Telephone Network (PSTN) and the Internet. At the same time, the electronic devices such as the mobile phone 43-45 can also perform communications and interactions through the network 42. For example, a personal communication session between any two electronic devices is established. Alternatively, a number of electronic devices can participate in a same group communication session, so that any user can send a communication message to all other users in the group communication session through an electronic device thereof. For example, when the group communication session is a cross-group communication session between multiple groups, group members in these groups can conduct group chat communications through this cross-group communication session.

Based on the above communication system, the present disclosure intends to be able to configure a message to be sent corresponding to a message sending control in a communication session page according to a content recognition result by performing content recognition on a communication message in the communication session page. As such, content in the message to be sent can be adapted to the content recognition result and a corresponding application scenario thereof, thus helping to improve the efficiency of communications.

The client ends of the mobile enterprise office platform running on the mobile phones 43-45 can separately recognize the content of a communication message, and configure a quick message corresponding to a quick sending control without any involvement of the server end of the mobile enterprise office platform that runs on the server 41. Alternatively, based on a process of communications and interactions between the server end running on the server 41 and the client ends running on the mobile phone 43-45, the server end cooperates with the client end to implement the communication solutions of the present disclosure.

Logical functions and processing procedures of the communication solutions of the present disclosure on a mobile enterprise office platform are described in detail below with reference to the embodiments.

Figure 5:
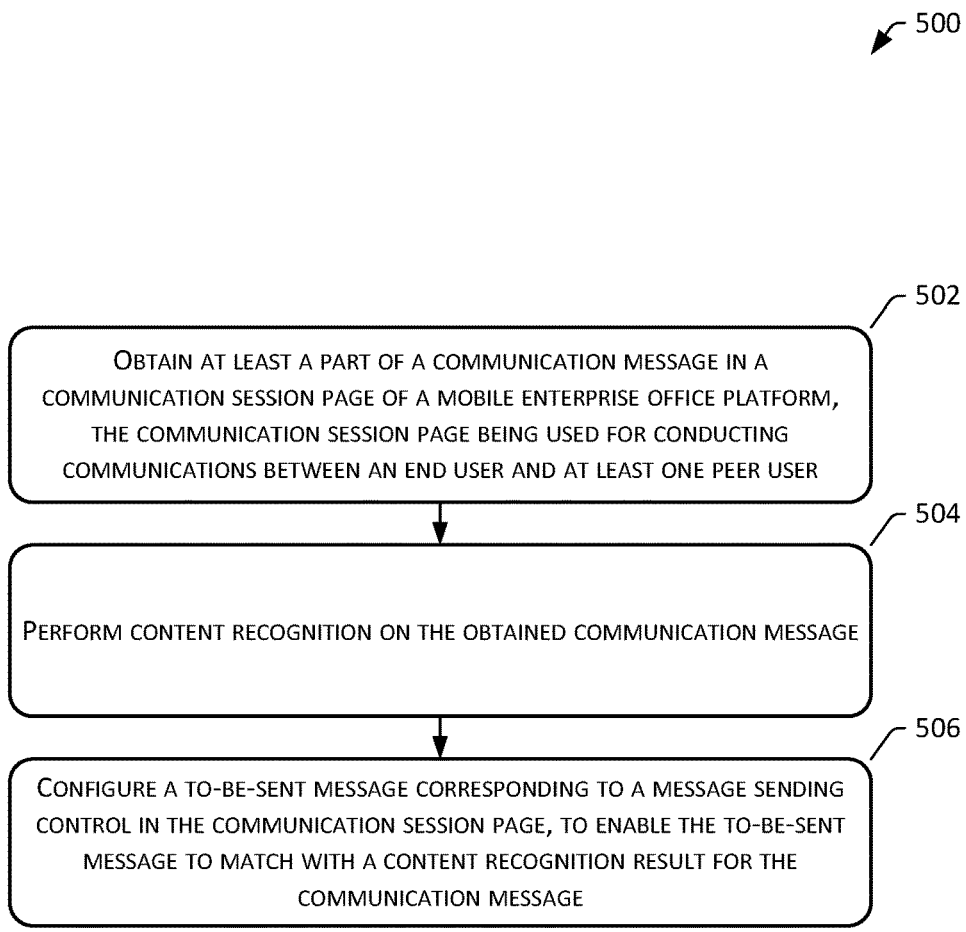
FIG. 5 is a flowchart of a communication method according to an exemplary embodiment of the present disclosure.

FIG. 5 is a flowchart of a communication method 500 according to an exemplary embodiment of the present disclosure. As shown in FIG. 5, the method is applied to a client end of a mobile enterprise office platform running on an electronic device, for example, the electronic device may be the mobile phones 43-45. The method 500 may include the following operations.

Operation 502: Obtain at least a part of a communication message in a communication session page of a mobile enterprise office platform, the communication session page being used for conducting communications between an end user and at least one peer user.

In the present embodiment, the mobile enterprise office platform can not only realize a communication function, but can also be used as an integrated function platform for a number of other functions, processing of internal events of an enterprise, such as approval events (such as leave, office item application, financial and other approval events), attendance events, task events, and log events, etc., and processing of external events such as ordering and purchasing, which are not limited in the present disclosure.

More specifically, the mobile enterprise office platform can be hosted in an instant messaging application in the related technologies, for example, Enterprise Instant Messaging (EIM) applications, such as Skype For Business®, Microsoft Teams®, Yammer®, Workplace®, Slack®, Enterprise WeChat®, Fxiaoke®, Enterprise Feixin®, Enterprise Yixin®, etc. Apparently, an instant communication function is only one of a number of communication functions supported by the mobile enterprise office platform. The enterprise office platform can also implement more functions such as the above other functions, which are not exhaustively described herein.

It should be noted that an application program of a client end of a mobile enterprise office platform can be pre-installed on an electronic device, so that the client end can be launched and run on the electronic device. Apparently, when an online "client end" such as HTML5 technology" is used, a corresponding application program does not need to be installed on the electronic device in order to obtain and run the client end.

In the present embodiment, the client end of the mobile enterprise office platform can perform content recognition on all communication messages in a communication session page, and configure messages to be sent according to corresponding content recognition results. Alternatively, the client end of the mobile enterprise office platform may perform content recognition only on a communication message that meets certain condition(s), and configure a message to be sent according to a corresponding content recognition result. For example, the condition(s) may include at least one of the following (which apparently are not limited by the present disclosure):

1) A communication message is located within a visible range of a user on a communication session page. Since a screen size of an electronic device is fixed, and a size of a communication session page increases as the number of communication messages increases, only a portion of area of the communication session page can be displayed on the screen of the electronic device. Communication message(s) within this part of area is/are considered as within a visible range of a user as described above. The end user can view a communication message only when the communication message is located within the visible range of the user, and there is a greater probability of wishing to send a similar message. Therefore, in this case, the content of the communication message can be recognized, and a message to be sent is further configured according to a content recognition result.

2) A difference between a time of sending a communication message and a time of obtaining the communication message does not exceed a preset time difference. When a difference between a time of sending a communication message and a current time (i.e., a time of obtaining the communication message) is relatively large, i.e., the communication message is a "historical message" that exists for a relatively long time. An end user usually has read the communication message already, and there is no need of sending a similar message based on such communication message (i.e., a content recognition result for the communication message). Therefore, no message to be sent is needed to be configured according to the communication message to avoid causing trouble to the end user. The preset time difference may be predefined by default in the mobile enterprise office platform, or customized by the end user according to actual needs, or predefined by other methods, which is not limited in the present disclosure.

3) A time of sending a communication message is on a same natural day as a time of obtaining the communication message. An end user often wants to send a relevant message for an event mentioned in a communication message. The event often has its time characteristics, such as birthday, holiday, anniversary, etc., and therefore it is meaningful only when a relevant message is sent within a natural day corresponding to the event. As such, a message to be sent according to the communication message is configured only when a time of sending the communication message is on a same natural day as a current time. Apparently, in some cases, certain events may last for a number of days. For example, "Chinese New Year" only occurs on the first day of the lunar calendar in a narrow sense. However, in a broad sense, the entire first month of the lunar calendar can be considered as within the "Chinese New Year". Therefore, the "same natural day" can also be extended to other lengths of time, such as within a same week, within a same calendar month, within a same lunar month, etc., which is not limited in the present disclosure.

4) The number of messages between a communication message and the latest communication message is not greater than a preset number. When the number of messages therebetween is relatively large, session members are likely to have departed from the original descriptive content of the communication message, and therefore a message to be sent according to the communication message is not needed to be configured to avoid causing trouble to an end user. The preset number may be predefined by default in the mobile enterprise office platform, or customized by the end user according to actual needs, or predefined by other methods, which is not limited in the present disclosure.

In the present embodiment, a communication session page refers to a function page corresponding to a communication session between an end user and at least one peer user. The communication session page can implement functions such as receiving, viewing, editing, and sending communication messages, etc., to implement communication operations between the end user and the at least one peer user. In some cases, the communication session page may have other names, which are, for example, a communication session window, a chat window, a chat page, a session window, a session page, a private chat window (between the end user and a single peer user), and a group chat window (between the end user and a plurality of peer users), etc., and are essentially the same as the "communication session page". The present disclosure has no limitations thereon.

Operation 504: Perform content recognition on the obtained communication message.

In the present embodiment, the mobile enterprise office platform can identify a described topic of the communication message, select a to-be-sent message matching the described topic, and associate the selected to-be-sent message to a message sending control. For example, when a described topic of a communication message is birthday, content of a to-be-sent message may be a birthday blessing. When a described topic of the communication message is an employment commemoration, content of a to-be-sent message may be a work blessing, etc. The mobile enterprise office platform can identify a described topic of a communication message in various ways. For example, in one case, a matching between a communication message and keywords corresponding to each described topic may be performed. In another case, semantics of a communication message can be identified, and a corresponding described topic can be inferred based on the semantics.

In the present embodiment, when multiple peer users exist, i.e., a communication session is a group communication session, and a communication message is a group communication message in the group communication session, the group communication message can be received by all group members. However, due to a large number of communication messages in a group communication session, it is easy for a group member to ignore the communication messages. Some group members may also set up a "Do Not Disturb" function for the group communication session (the group communication session does not provide any prompt for communication messages that are received), which leads to the communication messages being ignored more easily. Accordingly, a sender of a group communication message can specify a separate notification object for the group communication message, for example, adding notification indication information in a form of "@+member name" to the group communication message, so that the mobile enterprise office platform can recognize the notification indication information, send a message receiving notification to a separate notification object (i.e., a "group member" corresponding to the "member name") indicated by the notification indication information, and ensure that the separate notification object can view the group communication message when the message receiving notification has a greater authority than the "Do Not Disturb" function.

Then, after identifying the separate notification object indicated by the communication message, the mobile enterprise office platform may consider that the end user is likely to send the communication message for the separate notification object, and thus may add the notification indication information for the separate notification object in the to-be-sent message corresponding to the message sending control, without the need of manually inputting by the end user. The number of separate notification objects indicated by the communication message may be one or more, which is not limited in the present disclosure.

Apparently, the mobile enterprise office platform can simultaneously identify a described topic of a communication message and separate notification object(s), and add notification indication information corresponding to the notification object(s) into a to-be-sent message that corresponds to a message sending control and match with the described topic when configuring the to-be-sent message. This enables the separate notification object(s) to receive the communication message conforming to the described topic, and does not require an end user to manually input any content, thus greatly improving the efficiency of communications.

Operation 506: Configure a to-be-sent message corresponding to a message sending control in the communication session page, to enable the to-be-sent message to match with a content recognition result for the communication message.

In the present embodiment, a message sending control is used to trigger a function of sending a to-be-sent message. The message sending control can be a UI (User Interface) control, and can be, for example, represented as an icon, an option, a key, etc., in a communication session page, which is not limited in the present disclosure. The message sending control can be displayed and fixed in a preset position in the communication session page. The message sending control can also be displayed and hovered in the communication session page, so that a display position of the hovered message sending control can be arbitrarily adjusted in the communication session page. A variety of types of message sending controls may exist, such as a quick sending control (for example, the quick sending control 15 as shown in FIG. 3A), an expression selection control (for example, the expression selection control 17 as shown in FIG. 3B), etc. The fast sending control is used to send a to-be-sent message quickly. When the fast sending control is triggered by the end user, a corresponding to-be-sent message is quickly sent to at least one peer user, without the need of the end user to select or trigger the to-be-sent message, thus improving the efficiency of communications. When the expression selection control is triggered by the end user, an expression selection interface (such as the expression selection interface 18 as shown in FIG. 3B) is first displayed, and a to-be-sent message may include one or more expression icons in the expression selection interface (and the expression icons match with the content recognition result described above) for selection by the end user.

In the present embodiment, the message sending control may have one or more to-be-sent messages that match with the content recognition result. When the message sending control has multiple to-be-sent messages that match with the content recognition result, the mobile enterprise office platform may select a to-be-sent message therefrom, and send the selected to-be-sent message through the communication session page according to a detected triggering operation for the message sending control.

In one case, the mobile enterprise office platform can randomly select a to-be-sent message corresponding to the message sending control.

In another case, the mobile enterprise office platform may select a to-be-sent message according to a certain specification. For example, message content of the to-be-sent message may satisfy at least one of the following conditions:

1) The message content conforms to a historical communication habit of the end user, and the mobile enterprise office platform can learn the historical communication habit of the end user by learning historical communication data of the end user in advance, and avoid a selected to-be-sent message from being quite awkward.

2) The message content is matched to a status of relationship between the end user and a target communication object of the quick message, and the status of relationship may include at least one of a relationship type, a relationship affinity, etc. For example, the relationship type may include a colleague relationship, a friend relationship, a family relationship, etc. The relationship affinity can include close, ordinary, unfamiliar, etc. A variety of different statuses of relationship can be combined, such as "close colleagues", "ordinary friends", etc.

3) The message content is matched with a personal status of the target communication object of the to-be-sent message, etc., and the personal status may include at least one of personality, preference, mood, etc.

In the present embodiment, the triggering operation may be a persistent operation, such as a long press operation on the message sending control, so that preview content of a selected to-be-sent message may be displayed to the end user for preview when the triggering operation is maintained and continued (i.e., during a long press process). When the end user is satisfied with the selected to-be-sent message, the triggering operation may be completed and the to-be-sent message may be sent. When the end user is dissatisfied with the selected to-be-sent message, a canceling operation (sliding towards a preset direction) may be performed for the triggering operation, so that the mobile enterprise office platform can change the selected to-be-sent message, and display preview content of a new to-be-sent message when the end user performs a triggering operation again.

In the present embodiment, the message content of the to-be-sent message may include at least one of the following: a text, a static picture, a dynamic picture, a file, a virtual resource (such as mobile data traffic, call duration, funds, etc.), which are apparently not limited in the present disclosure.

In the present embodiment, the mobile enterprise office platform may obtain first manual input content inputted and sent by the end user through an input box of the communication session page. When the first manual input content matches the communication message, the to-be-sent message corresponding to the message sending control is restored to initial content, so as to avoid the normal use of the message sending control being affected by the end user.

In the present embodiment, when a specific attribute of any associated user of the end user meets a predefined prompting rule, the mobile enterprise office platform may display a prompt page related to the any associated user. For example, a predefined prompting rule may include: 1) a status of relationship between any user and the end user; and 2) reaching or near an associated date of a specific event of the any user, such as a "colleague's birthday", a "friend's wedding anniversary", etc., which can be set by default by the mobile enterprise office platform or defined by the end user. By displaying the above prompt page, the need of memorizing by the end user can be alleviated, and the end user can be prevented from forgetting an operation of sending the communication message.

Furthermore, in response to detecting a triggering operation for the prompt page, the mobile enterprise office platform may send a communication message that is targeted to the any associated user in a group where both the end user and the any associated user exist, and message content of the communication message is related to the specific attribute. For example, when the predefined prompting rule is a "colleague's birthday", the end user can conveniently send a birthday blessing to the colleague by presenting a prompt page about the colleague's birthday to the end user, which does not require special memory, and can avoid discourtesy due to forgetting.

In the present embodiment, when the communication message for the any associated user is used for allocating a virtual resource, the mobile enterprise office platform may be configured to have or uniquely have allocation rights of the virtual resource, thereby ensuring an optimal allocation of the virtual resource and avoiding the virtual resource being fully allocated to other group members.

In the present embodiment, the any associated user may be configured as a corresponding separate notification object in the communication message for the any associated user, thereby preventing the any associated user from missing the communication message by sending a separate information receiving notification to the any associated user.

In the present embodiment, the communication message for the any associated user may be obtained in a plurality of ways. In one case, the communication message may be generated by the mobile enterprise office platform based on second manual input content inputted by the end user. In another case, predefined message content related to the specific attribute may be selected by the mobile enterprise office platform, and a communication message for the any associated user may be generated, wherein a mapping relationship between the specific attribute and the predefined message content can be pre-defined in the mobile enterprise office platform or actively learned by the mobile enterprise office platform.

Figure 6:
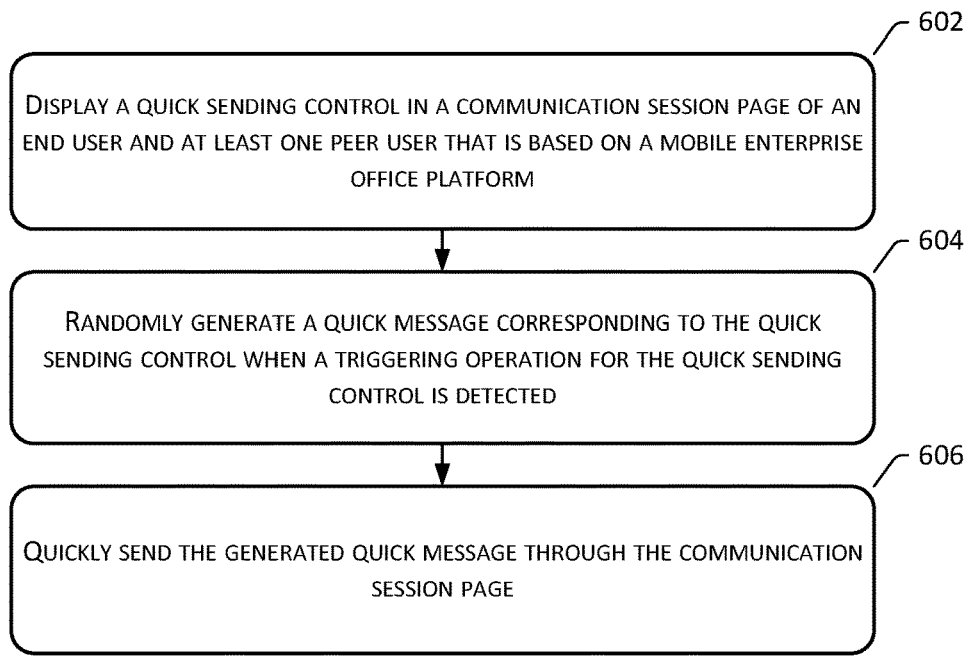
FIG. 6 is a flowchart of another communication method according to an exemplary embodiment of the present disclosure.

FIG. 6 is a flowchart of another communication method 600 according to an exemplary embodiment of the present disclosure. As shown in FIG. 6, the method 600 is applied to a client end of a mobile enterprise office platform running on an electronic device, and may include the following operations.

Operation 602: Display a quick sending control in a communication session page of an end user and at least one peer user that is based on a mobile enterprise office platform.

Operation 604: Randomly generate a quick message corresponding to the quick sending control when a triggering operation for the quick sending control is detected.

In the present embodiment, message content of the generated quick message may satisfy at least one of the following conditions: the message content conforming to a historical communication habit of the end user; the message content matching a status of relationship between the end user and a target communication object of the quick message; and the message content matching a personal status of the target communication object of the quick message. Apparently, other conditions may also be used, which are not limited in the present disclosure.

In the present embodiment, when the triggering operation is maintained and continued, preview content of a selected quick message may be displayed, so that the end user can preview thereof. When the end user is dissatisfied with the selected quick message, a canceling operation can be implemented for the triggering operation, so that the mobile enterprise office platform can replace the selected quick message.

Operation 606: Quickly send the generated quick message through the communication session page.

For ease of understanding, the technical solutions of the present disclosure are further described below using an enterprise instant communication application "Enterprise WeChat" as an example. Enterprise WeChat client ends are assumed to be running on mobile phones 43-45, and an enterprise WeChat server end is assumed to be running on a server 41. The enterprise WeChat client ends on the mobile phones 43-45 are logged in with registered accounts of users local thereto, so that the mobile phones 43-45 can implement the communication solutions of the present disclosure.

Figure 7:
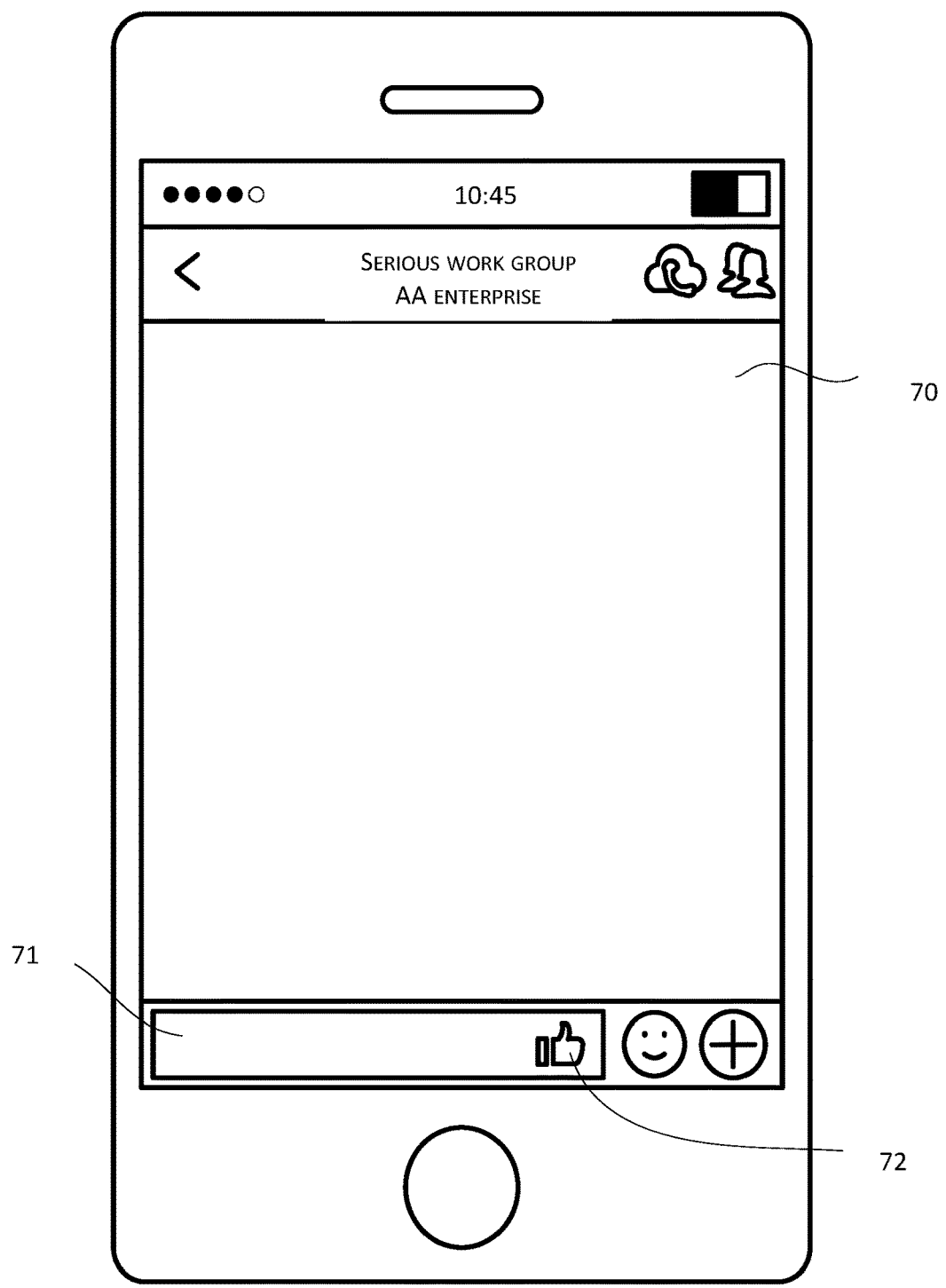
FIG. 7 is a schematic diagram of a communication session page when a quick sending control is in a default state according to an exemplary embodiment of the present disclosure.

FIG. 7 is a schematic diagram of a communication session page according to an exemplary embodiment of the present disclosure. FIG. 7 shows an example in which an enterprise WeChat client end displays a communication session page 70 corresponding to a group "serious work group". An input box 71 in the communication session page 70 may include a quick sending control 72. In response to detecting a triggering operation of an end user on the quick sending control 72, a quick message associated with the quick sending control 72 can be quickly sent without the need of the end user to invoke the input box 71 for manual input. It should be noted that the quick sending control 72 may be located at any other position in the communication session page 70 in addition to the input box 71, which is not limited in the present disclosure.

Based on the technical solutions of the present disclosure, a quick message associated with the quick sending control 72 can be configured by recognizing the message content of the communication message in the communication session page 70, thereby making it suitable for the corresponding communication session scenario.

The communication session page 70 as shown in FIG. 7 is assumed to have no communication message or any communication message that satisfies condition(s) (the condition(s) is omitted here, and will be described in detail in the following text), and the quick message associated with the quick sending control 72 may be a default message. For example, the default message may be a "like" icon as shown in FIG. 3 (i.e., the quick message 16 as shown in FIG. 3). Accordingly, a display icon of the quick sending control 72 may match with the quick message, for example, the quick sending control 72 can employ a "like" icon shown in FIG. 7.

Figure 8:
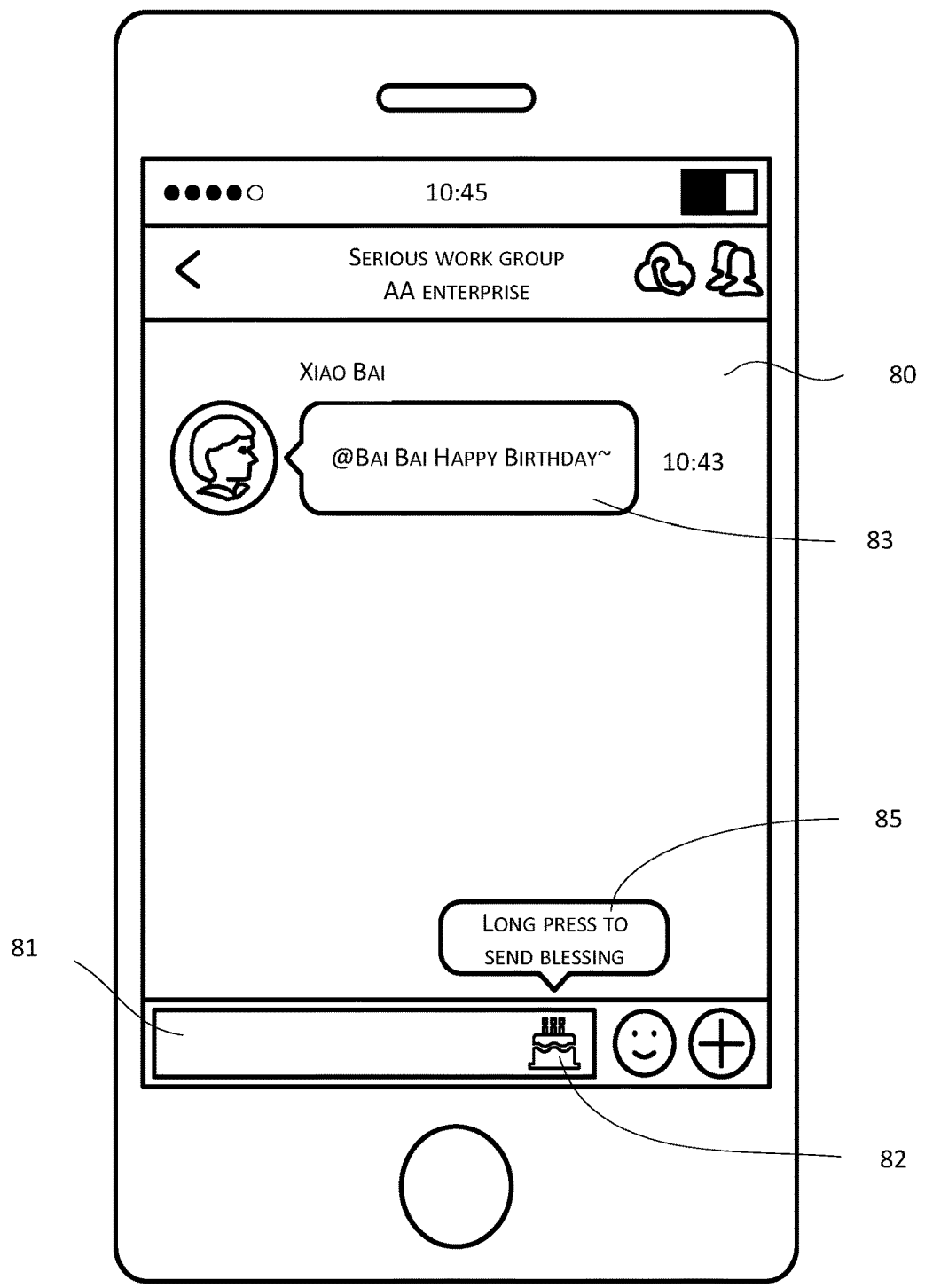
FIG. 8 is a schematic diagram of a communication session page after a quick message matched with a quick sending control is configured according to an exemplary embodiment of the present disclosure.

In a communication session page 80 as shown in FIG. 8, a communication message 83 sent by a group member "Xiao Bai" is assumed to be "@Bai Bai Happy Birthday~". An enterprise WeChat client end can recognize message content of the communication message 83, and configure a cross-boundary message associated with a quick sending control 82 in an input box 81 based on a content recognition result. An enterprise WeChat client end may locally recognize the message content of the communication message 83. Alternatively, enterprise WeChat server end may recognize the message content of the communication message 83, and then notify the enterprise WeChat client end of a content recognition result.

The content recognition result of the communication message 83 may include two parts: first, determining that a described topic of the communication message 83 is "birthday"; and second, determining that the communication message 83 has a separate notification object as "Bai Bai". For a method of identifying the described topic, "matching keywords" may be adopted, i.e., by pre-defining keywords corresponding to respective described topics, and matching the communication message 83 with the predefined keywords. As such, when the communication message 83 has message content that matches a certain keyword, a determination can be made that the communication message 83 matches a described topic corresponding to that keyword. For example, a keyword corresponding to a described topic "birthday" is assumed to be predefined as "birthday", etc. Since the message content of the communication message 83 contains a "birthday" keyword, a determination is made that the described topic thereof is "birthday". For a "separate notification object", message content of a specific format in the communication message 83 can be identified. For example, notification indication information of "@+member name" is usually used to indicate the separate notification object. As such, since the communication message 83 contains "@Bai Bai", a determination can be made that the separate notification object is a group member "Bai Bai".

Based on the content recognition result for the "described topic", the enterprise WeChat client end can configure a quick message associated with the quick sending control 82, so that the quick message is related to "birthday". An icon of the quick sending control 82 can be switched from the "like" icon to a "birthday cake" icon, to help the end user to perceive the quick message configured by the enterprise WeChat client end, and fit into the above "Birthday" described topic. At the same time, the end user can be guided to trigger the quick sending control 82 by displaying prompt information 85 such as "long press to send a blessing".

Figure 9A:
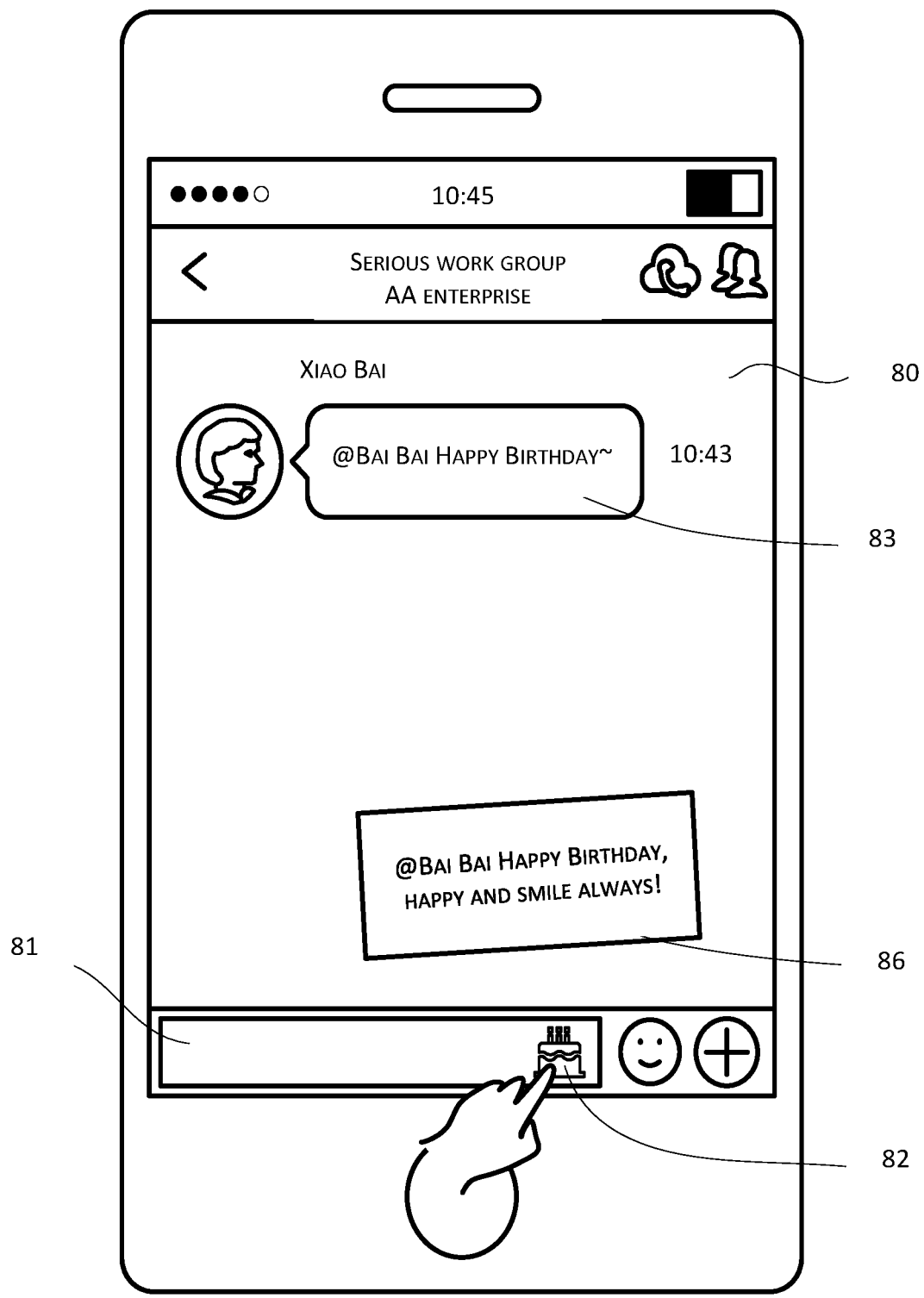
FIGS. 9A-9B are schematic diagrams of a communication session page for displaying preview content of a quick message according to an exemplary embodiment of the present disclosure.
Figure 10:
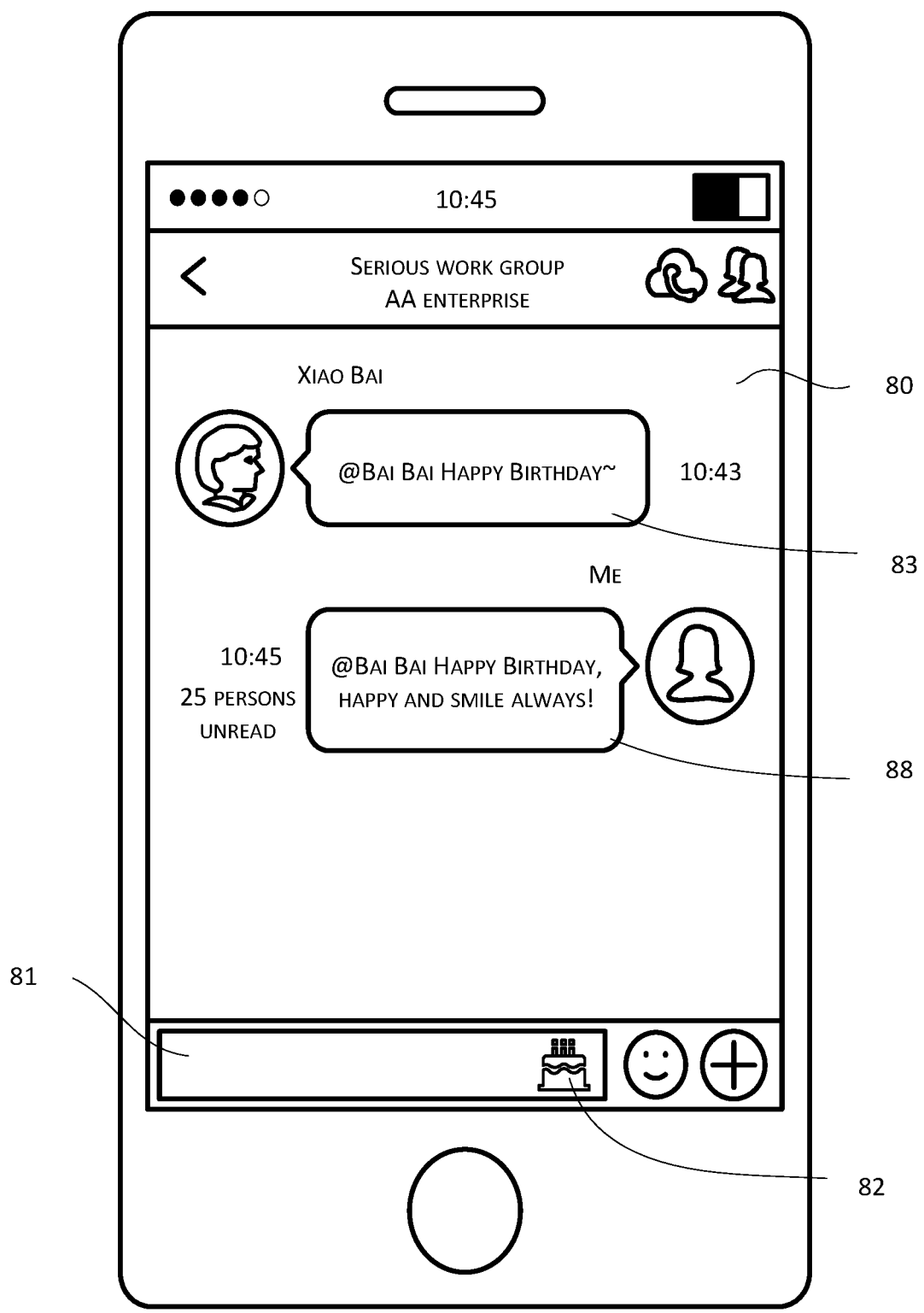
FIG. 10 is a schematic diagram of a communication session page after a quick message is sent according to an exemplary embodiment of the present disclosure.

In response to detecting that the end user performs a predefined triggering operation on the quick sending control 82, the enterprise WeChat client end may select a quick message associated with the quick sending control 82 for sending the quick message through the communication session page 80. In an embodiment, in response to detecting a long press operation on the quick sending control 82, the enterprise WeChat client end may display preview content 86 corresponding to a quick message to be sent as shown in FIG. 9A during the duration of the long press operation for the end user to preview. If the end user is satisfied with the preview content, the long press operation may be terminated, so that the quick message corresponding to the preview content 86 is quickly sent out, forming a communication message 88 as shown in FIG. 10.

Apparently, the preview content 86 does not have to be displayed. However, by displaying the preview content 86, it is obviously helpful for the end user to determine the content of the quick message, and avoid sending inappropriate message content. Moreover, the triggering operation for the quick sending control 82 is not limited to a long press operation. For example, especially when being not less than the preview content 86 that is displayed, the triggering operation may include a clicking operation for the quick sending control 82, thereby further enhancing the efficiency of sending the quick message.

For each described topic, the quick sending control 82 may have one or more associated quick messages. The enterprise WeChat client end needs to select a quick message from among these quick messages in each time, and sends the selected quick message through the communication session page 80. In an embodiment, the enterprise WeChat client end may randomly select a quick message corresponding to the quick sending control 82. In another embodiment, the enterprise WeChat client end may select an appropriate quick message according to a predefined selection condition. The selection condition may include, for example, at least one of the following:

1) Message content conforms to a historical communication habit of the end user. The enterprise WeChat can obtain and analyze historical communication data of the end user, so as to learn the historical communication habit of the end user, for example, message content that the end user is accustomed to use for each described topic, or message content that the end user is accustomed to use for each peer user, etc., so as to appropriately select a quick message that conforms to the historical communication habit of the end user.

2) Message content matches a status of relationship between the end user and a target communication object of a quick message. The enterprise WeChat can analyze a status of relationship between the end user and a target communication object (for example, a group member "Bai Bai" in the above embodiment, etc.). For example, a relationship type is a colleague, a friend, or a relative. For another example, a relationship affinity is close, normal, or unfamiliar, etc., so as to properly select a quick message that matches the status of relationship.

3) Message content matches a personal status of a target communication object of a quick message. The enterprise WeChat can analyze a personal status of a target communication object, for example, a long-term personal status such as personality, preference, etc., or a short-term personal status such as emotion (even a real-time personal condition such as a real-time emotion), etc., so as to properly select a quick message that meets the personal status.

Figure 9B:
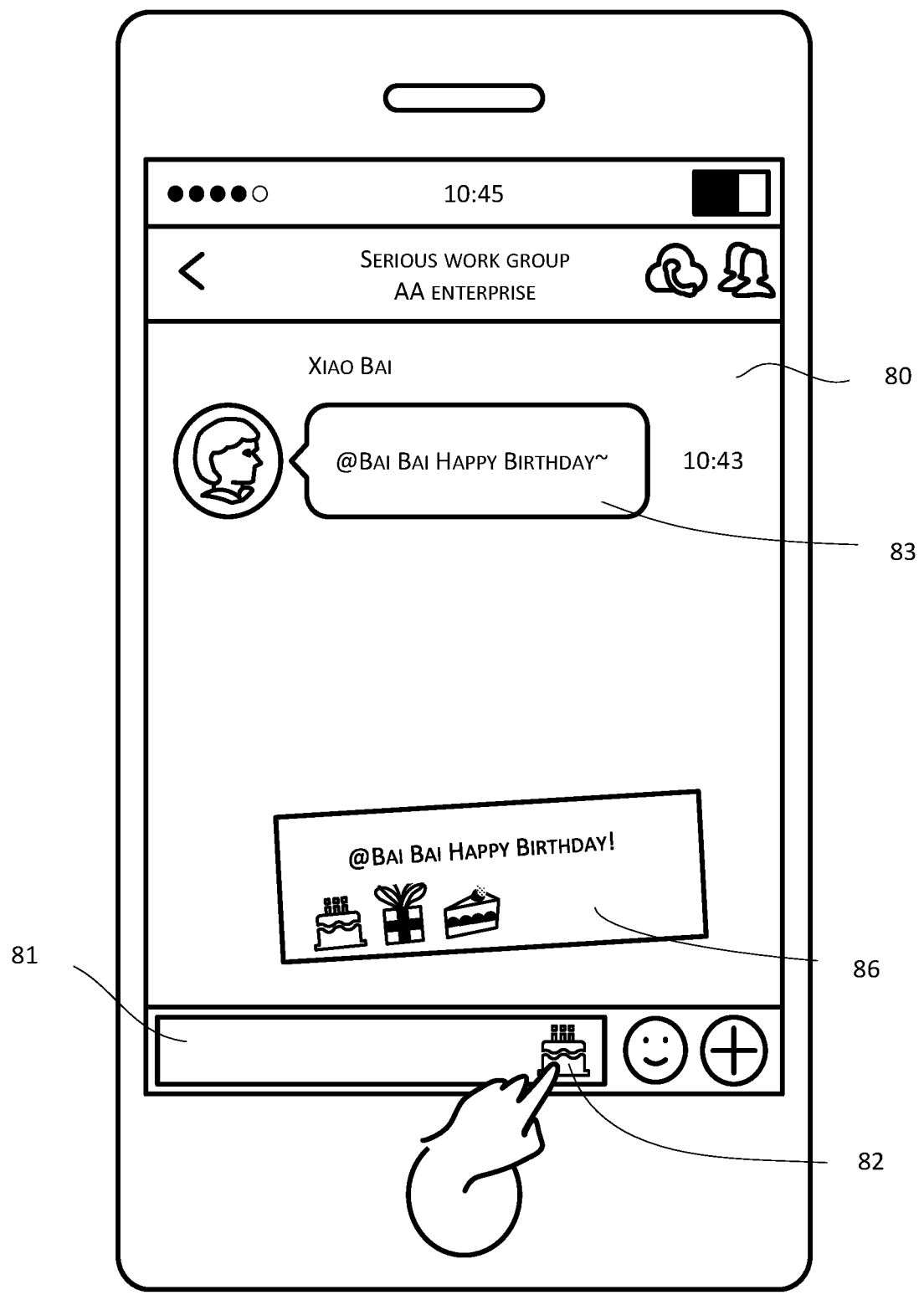

For a certain described topic, such as the above "birthday" described topic, if multiple quick messages associated with the quick sending control 82 exist, the end user may pro- actively make a selection, other than the enterprise WeChat selecting a quick message according to the above method. For example, as shown in FIG. 9A, when the end user performs a long press operation on the quick sending control 82, the enterprise WeChat client end may display the preview content 86. When the end user is dissatisfied with the preview content 86, the end user can perform a canceling operation of the triggering operation (i.e., the long press operation) during a process of displaying the preview content 86. For example, the canceling operation may be a sliding operation toward the upper side (or other predefined direction) (so that a touch point is moved upwards from the quick sending control 82 by a predefined distance), and the enterprise WeChat client end can cancel the quick sending of the preview content 86. When the end user performs the long press operation on the quick sending control 82 again (in an embodiment, a time difference between "previous" and "again" needs to be within a certain time interval), the enterprise WeChat client end can replace the selected quick message, and display preview content corresponding to a new quick message after replacement. For example, the preview content 86 "@Bai Bai Happy Birthday, happy and smile always!" as shown in FIG. 9A can be replaced with an expression icon such as "@Bai BaiHappy Birthday!"+ "birthday cake", "gift", "cake", etc., as shown in FIG. 9B, for the end user to view. As such, the end user can view and select various quick messages according to the above method, thus being able to send a quick message that is in line with his/her need.

Based on the content recognition result for the "separate notification object", the enterprise WeChat client end can configure a quick message associated with the quick sending control 82, such that notification indication information for the separate notification object is added into the quick message. For example, as shown in FIG. 10, in response to recognizing that notification indication information "@Bai Bai" is included in the communication message 83 or the separate notification object is indicated according to other forms, the enterprise WeChat client end may add corresponding notification indication information such as "@Bai Bai" into the quick message for the separate notification object, so that the communication message 88 including "@Bai Bai Happy Birthday, happy and smile always!" is obtained.

It should be noted that, in the embodiment shown in FIG. 10 and related drawings, the enterprise WeChat client end simultaneously identifies the described topic and the separate notification object as described above, thereby simultaneously configuring a quick message matching the described topic, and adding notification indication information corresponding to the separate notification object into the quick message. In other embodiments, the enterprise WeChat client end can only identify the described topic without identifying the separate notification object. As such, a final quick message may not include the notification indication information. For example, the quick message is only "Happy Birthday, happy and smile always!", without "@Bai Bai". Alternatively, the enterprise WeChat client end can identify a separate notification object only, so that a final quick message does not change according to a described topic (for example, which can be preset to information content of a wider scope of application, to avoid being appeared as awkward). However, the quick message may include notification indication information corresponding to the separate notification object, so that an enterprise WeChat client end used by the separate notification object can send a separate message receiving notification to the separate notification object, to prevent the quick message from being missed.

As described above, the enterprise WeChat client end can perform content recognition only on communication messages that satisfy condition(s), and configure quick messages accordingly. For example, the condition(s) can include at least one of the following:

1) A communication message is located within a visible range of a user on a communication session page. For example, as shown in FIG. 8, when the communication message 83 is located in the visible range of the user of the communication session page 80, i.e., the end user can directly view the communication message 83 from screens of the mobile phones 43-45, it is highly probable that the end user desires to send a quick message similar to the communication message 83. Therefore, in this case, the enterprise WeChat client end can perform content recognition on the communication message 83, and further configure a quick message matching the quick sending control 82 according to the content recognition result.

When the number of communication messages included in the communication session page 80 is relatively large, only a few communication messages that are recently received can be located within the user's visible range due to fixed screen specifications of the mobile phones 43-45, and other communication messages cannot be viewed by the end user. Therefore, content recognition of these communication messages can be canceled, and respective quick messages matching the quick sending control 82 need not be configured.

Figure 11:
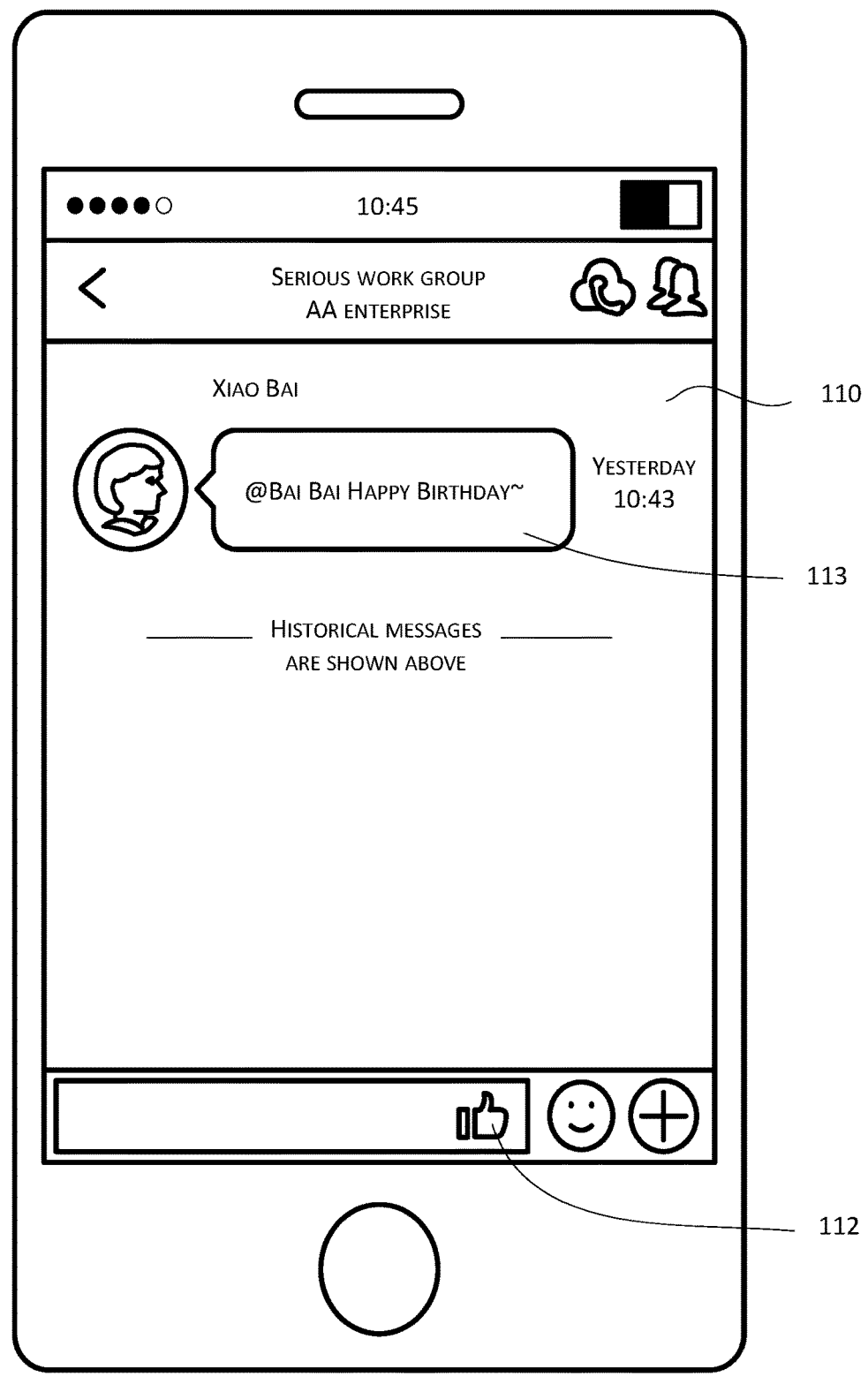
FIG. 11 is a schematic diagram of another communication session page when a quick sending control is in a default state according to an exemplary embodiment of the present disclosure.

2) A difference between a time of sending a communication message and a time of obtaining the communication message does not exceed a preset time difference. When a time of sending a communication message is different from a current time (i.e., a time of obtaining the communication message), i.e., the communication message is a "historical message" that exists for a relatively long time, the end user has already read the communication message in most cases, and there is no need to send a quick message based on the communication message (i.e., a content recognition result for the communication message) Therefore, no quick message is needed to be configured based on the communication message, to avoid causing trouble to the end user. For example, as shown in FIG. 11, if the preset time difference is 3 hours, although the communication message 113 is located within the user's visible range on the communication session page 110, content recognition of this communication message 113 can be cancelled because a time difference between the communication message 113 and the current time is more than 3 hours, and there is no need to configure a quick message matching the quick sending control 112.

3) A time of sending a communication message is on a same natural day as a time of obtaining the communication message. An end user often wants to send a quick message that is relevant to an event mentioned in a communication message. The event often has its time characteristics, such as birthday, holiday, anniversary, etc., and therefore it is meaningful only when a quick message that is relevant is sent within a natural day corresponding to the event. As such, a quick message according to the communication message is configured only when a time of sending the communication message is on a same natural day as a current time. For example, as shown in FIG. 11, although the communication message 113 is located within the user's visible range on the communication session page 110, content recognition of the communication message 113 can be cancelled because the communication message 113 is not in the same natural day as the current time, and there is no need to configure a quick message matching the quick sending control 112.

4) The number of messages between a communication message and the latest communication message is not greater than a preset number. When the number of messages therebetween is relatively large, session members are likely to have departed from the original descriptive content of the communication message, and therefore a quick message according to the communication message is not needed to be configured to avoid causing trouble to an end user.

Apparently, other conditions may also be employed, and the present disclosure does not have any limitations thereon. The above multiple conditions are used as an example. An enterprise WeChat client end can operate based on one condition, or can operate based on multiple conditions at the same time. When multiple conditions are based upon simultaneously:

In one case, content of a communication message can be recognized when multiple conditions are satisfied, and a quick message matching the quick sending control is further configured. When any condition is not satisfied, content recognition is not needed to be performed on the communication message, and there is no need to configure a quick message matching the quick sending control. For example, as shown in FIG. 11, if the above condition 1) and condition 2) are simultaneously considered, and the preset time difference corresponding to the condition 2) is 3 hours, content recognition is not needed to be performed on the communication message 113 because the condition 1) is satisfied and the condition 2) is not satisfied, and there is no need to configure a quick message that matches the quick sending control 112.

In another case, based on respective priority levels of each condition, recognition of content of a communication message can be performed when a condition of a high priority level is satisfied, regardless of whether a condition of a low priority level is satisfied, and a quick message that matches the quick sending control is further configured. For example, as shown in FIG. 11, the above condition 1) and condition 2) are assumed to be simultaneously considered, wherein the preset time difference corresponding to the condition 2) is 3 hours, and a priority level of the condition 1) is higher than that of the condition 2). Although a time difference between the communication message 113 and the current time is more than 3 hours, recognition of the content of the communication message 113 can still be performed, because the communication message 113 is located within the user's viewable range on the communication session page 110, and a quick message matching the quick sending control 112 is further configured.

Figure 12:
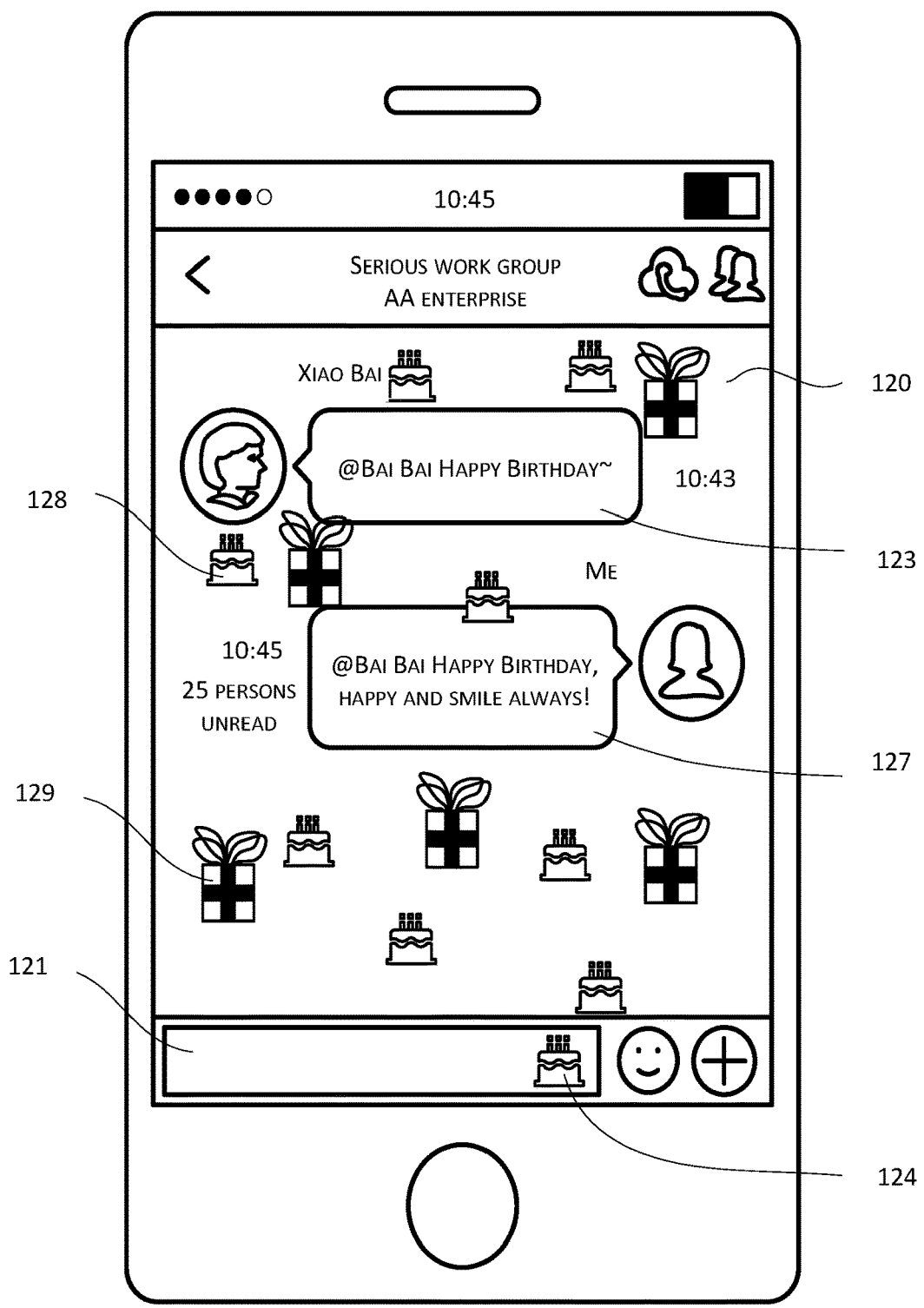
FIG. 12 is a schematic diagram of another communication session page after a quick message is sent according to an exemplary embodiment of the present disclosure.

As shown in FIG. 12, in a communication session page 120, if the enterprise WeChat client end recognizes that a described topic is "birthday" and a separate notification object is "Bai Bai" from a content recognition result of the communication message 123, and accordingly configures a quick message matching the quick sending control 124. Message content of the quick message may include at least one of the following types: a text, a static picture, a dynamic picture, a file, a virtual resource, etc. For example, the quick message may include a text of "@Bai Bai Happy Birthday, happy and smile always!" included in the communication message 127, and the quick message may further include a "birthday cake" icon 128, a "gift" icon 129 and the like, displayed in the communication session page 120, wherein the "birthday cake" icon 128, the "gift" icon 129, etc. may be a static picture (which may disappear automatically after a preset duration), or may be a dynamic picture (a "dynamic" form may include: "falling" downwards in the communication session page 120, etc., and being able to be disappeared automatically after "falling" to the bottom of the communication session page 120).

Figure 13:
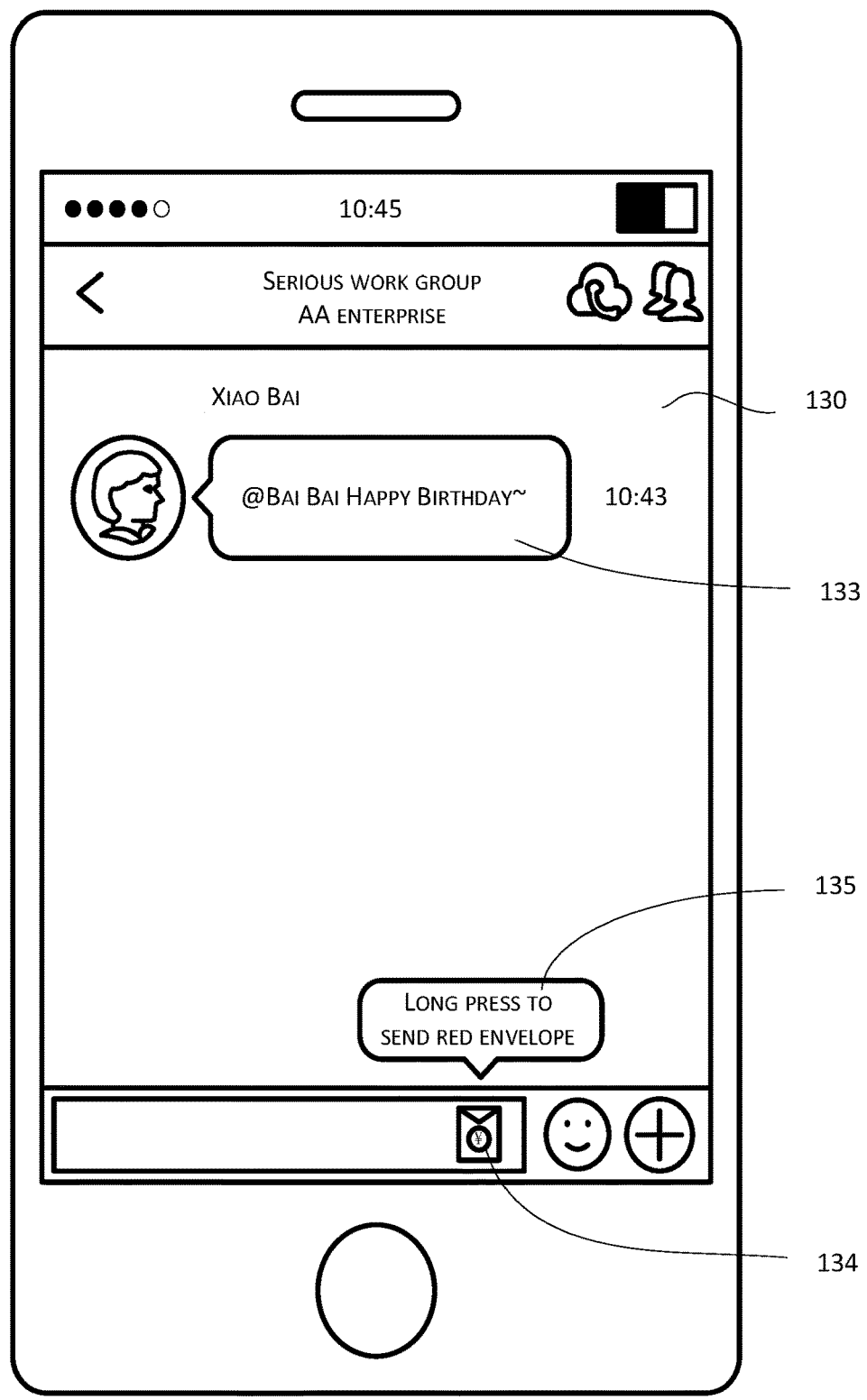
FIG. 13 is a schematic diagram of another communication session page after a quick message matched with a quick sending control is provided according to an exemplary embodiment of the present disclosure.

The virtual resource may include: mobile data traffic, call duration, funds, etc., which is not limited in the present disclosure. The virtual resource in a form of "funds" is used as an example. As shown in FIG. 13, in response to detecting a communication message 133 in a communication session page 130, the enterprise WeChat client end determines that a described topic is "Birthday" and a separate notification object is "Bai Bai" by recognizing content of the communication message 133, and thereby sets up a quick message matching a quick sending control 134, so that the quick message is used to send a "red envelope" to the separate notification object "Bai Bai". The "red envelope" is used for allocating a certain amount of funds from the end user to the separate notification object "Bai Bai". In the communication session page 130, the end user can be guided to perform a triggering operation on the quick sending control 134 by displaying prompt information 135 such as "long press to send a red envelope". At the same time, the quick sending control 134 can adopt an adapted "red envelope" icon.

Figure 14A:
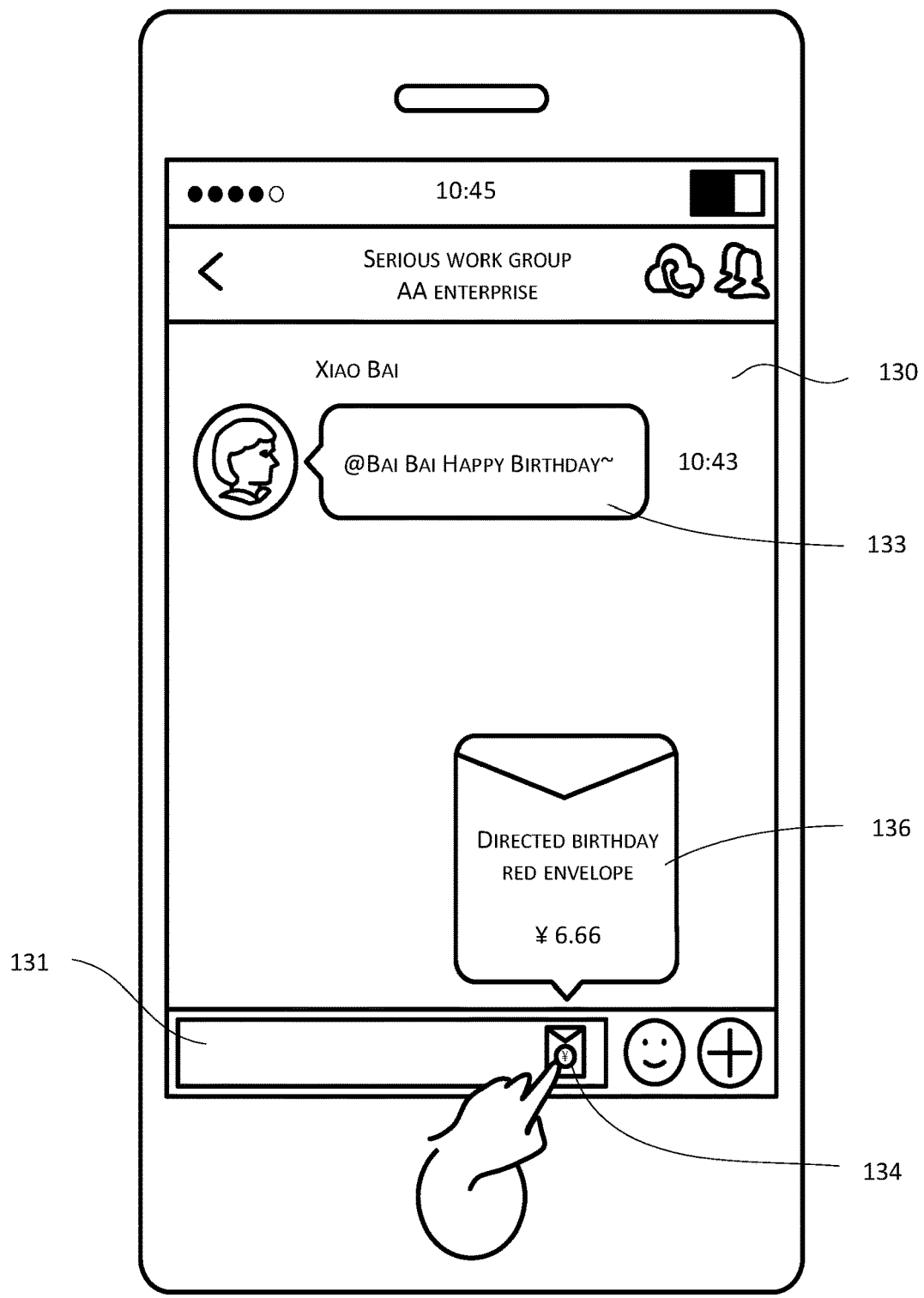
FIG. 14A is a schematic diagram of another communication session page for displaying preview content of a quick message according to an exemplary embodiment of the present disclosure.
Figure 14B:
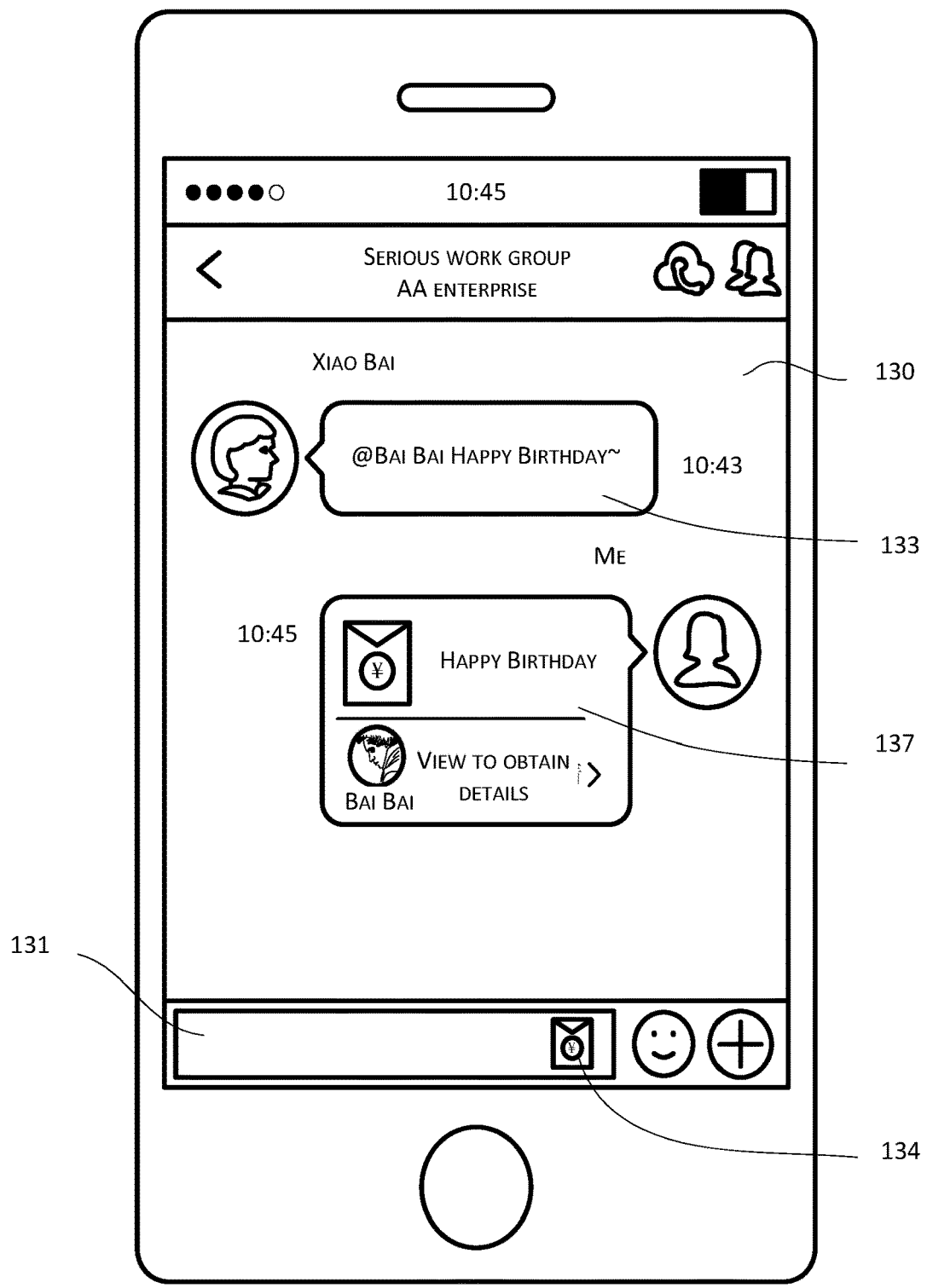
FIG. 14B is a schematic diagram of another communication session page after a quick message is sent according to an exemplary embodiment of the present disclosure.

In response to detecting that the end user performs a triggering operation on the quick sending control 134, preview content 136 as shown in FIG. 14A may be displayed, and the preview content 136 may include: a type of red envelope being "directed birthday red envelope", and the red envelope corresponding to an amount of funds being "6.66" (this value can be randomly generated or predefined). In this case, when the end user performs a canceling operation such as sliding upwards, sending of the quick message can be cancelled. For example, when the end user wants to change the amount of funds, a canceling operation can be performed, and a triggering operation can be performed again, so that the enterprise WeChat client end can switch the amount of funds to another random number. When the end user terminates the triggering operation, the enterprise WeChat client end may send a communication message 137 as shown in FIG. 14B, and the communication message 137 is used to send the red envelope to a group member "Bai Bai".

When the group member "Bai Bai" logs into an enterprise WeChat client end thereof, and views a group "serious work group", the above communication message 137 can be received, and a corresponding fund is received by triggering the communication message 137. The communication message 137 may include text content (such as a picture or other content) such as "Happy Birthday" to fit a described topic of "birthday" as described above. At the same time, when the red envelope is "directed birthday red envelope", this means that only the group member "Bai Bai" can trigger the communication message 137 to receive the corresponding funds, even though all group members of the group "serious work group" can receive the high communication message 137, thereby fitting the "separate notification object" as mentioned above. Apparently, in other embodiments, the red envelope that is sent based on the quick sending control 134 may be a non-directed red envelope, but it needs to be ensured that the group member "Bai Bai" has the right to be allocated with the funds in the red envelope.

When the red envelope is a non-directed red envelope, it can be at least ensured that the group member "Bai Bai" can be allocated to at least a part of the funds in the red envelope. For example, when the funds corresponding to the red envelope are divided into 10 shares, and the number of members of the group "serious work group" is 12 and is greater than the number of shares of the funds, then it needs to be ensured that at least one share of the funds of the red envelope is allocated to the group member "Bai Bai". One share of the funds of the red envelope can be designated when the red envelope is generated, and it is ensured that only the group member "Bai Bai" to have the right to be allocated with such share of the funds of the red envelope. Other group members can only be allocated with the other 9 shares of the funds of the red envelope. Alternatively, 10 shares of the funds of the red envelope with the same rights are generated. When only 1 share of the funds of the red envelope is remained, if the group member "Bai Bai" has not yet received the red envelope, the remaining one share of the funds of the red envelope is set in such a way that only the group member "Bai Bai" has the allocation rights.

Figure 15:
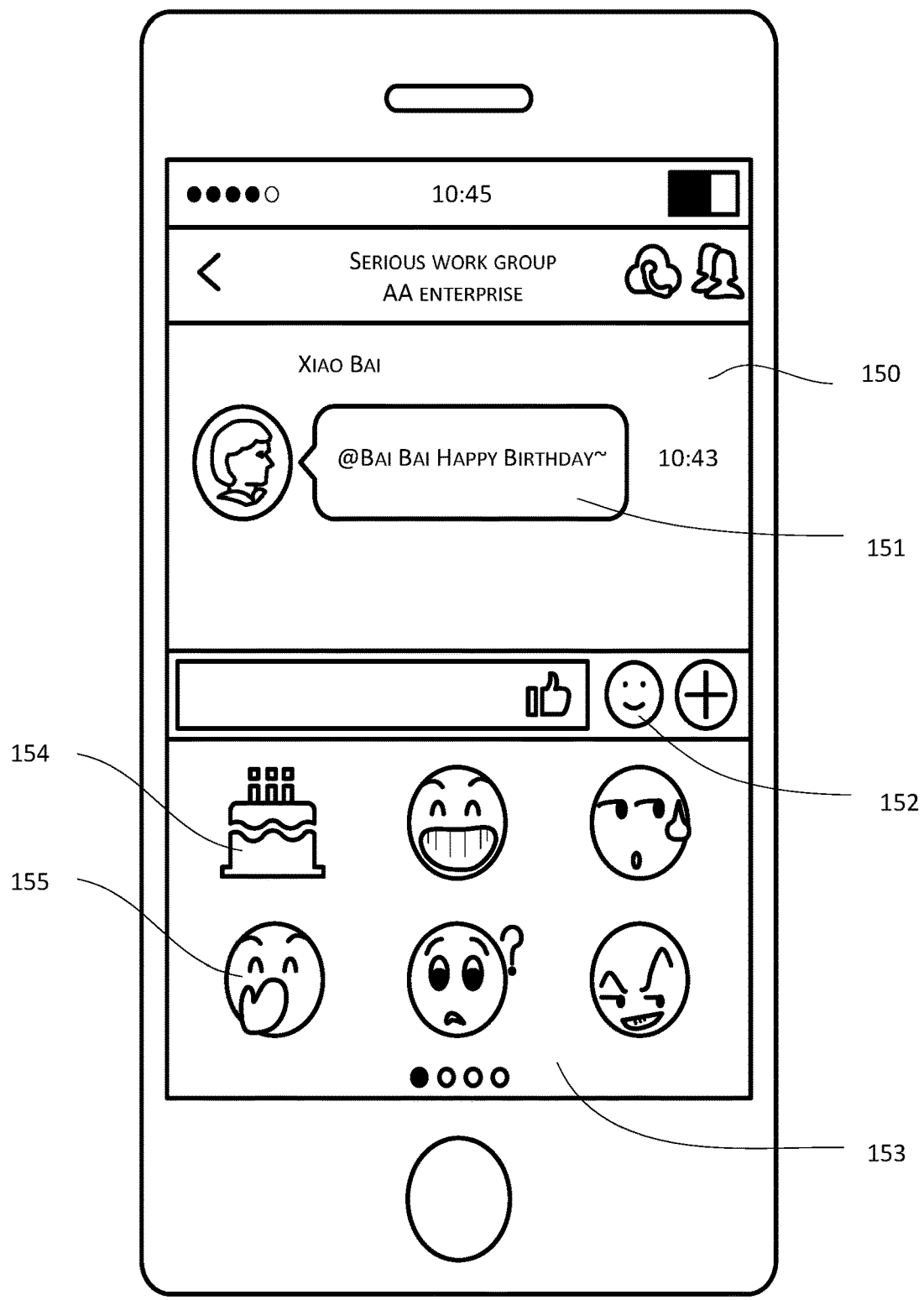
FIG. 15 is a schematic diagram of quickly sending an emoticon icon through an emoticon selection control according to an exemplary embodiment of the present disclosure.

As described above, by performing content recognition on a communication message, the present disclosure can configure a to-be-sent message that matches with a message sending control according to a content recognition result, so that message content of the to-be-sent message matches the content recognition result. In this case, the message sending control in the present disclosure may include other types, such as an expression sending control, in addition to the quick sending control that is described in the foregoing description. For example, as shown in FIG. 15, after receiving a communication message 151 in a communication session page 150, content recognition can be performed on the communication message 151. Furthermore, when an end user triggers an expression sending control 152, an expression selection interface 153 can be displayed in the communication session page 150. The expression selection interface 153 may include a real-time expression 154 matching a content recognition result, and may also include a default expression 155 that is irrelevant to the content recognition result. Furthermore, the expression selection interface 153 may include one or more real-time expressions 154, which are not limited in the present disclosure.

Therefore, by performing content recognition on the communication message 151 and displaying the real-time expressions 154 matching the content recognition result in the expression selection interface 153, it is convenient for the end user to make a selection according to an actual situation without the need of perform an active search, thus helping to improve the efficiency of communications.

In addition, the enterprise WeChat client end can also restore a quick message corresponding to the fast sending control under certain condition(s), and the condition(s) may include at least one of the following:

1) The enterprise WeChat client end determines that no communication message that satisfies the condition(s) in the communication session page. FIG. 14B is used as an example. If the communication message 133 is moved out of the user's visible range of the communication session page 130 due to a display of other communication messages, the enterprise WeChat client end can restore a quick message matching the quick sending control 134 to a "like" icon as shown in FIG. 3, and the quick sending control 134 itself can also be restored from the "red envelope" icon to the "like" icon as shown in FIG. 3 or 7.

2) The end user successfully sends a quick message through the configured quick sending control. FIG. 14B is used as an example. If the end user performs a triggering operation on the quick sending control 134, so that the enterprise WeChat client end successfully sends a corresponding quick message, such as the communication message 137 that includes a red envelope, the enterprise WeChat client end can determine that the end user no longer needs to send a red envelope. Therefore, the quick message matching the quick sending control 134 is restored to a "like" icon.

3) After a quick message matching the quick sending control is configured, the end user quits and re-enters a corresponding communication session page. FIG. 14B is used as an example. If the end user does not perform a triggering operation on the quick sending control 134, the end user can quits and re-enters the communication session page 130, so that the enterprise WeChat client end determines that the end user does not need to send a red envelope, and restores the quick message matching the quick sending control 134 to a "like" icon.

4) FIG. 14B is used as an example. When the end user inputs and sends manual input content through the input box 131 in the communication session page 130, and the manual input content matches with the communication message 133, the enterprise WeChat client end can determine that the end user does not want to send a red envelope through the quick sending control 134. Therefore, the quick message matching the quick sending control 134 can be restored to a "like" icon.

Based on the technical solutions described in the above embodiments, FIG. 14B is used as an example. When a group member "Xiao Bai" sends a communication message 133 in a communication session page 130, and the communication message 133 is related to a predefined described topic or group member, other group members (such as the end user) can quickly send out quick messages of similar content by configuring a quick message matching the quick sending control 134, thereby improving the efficiency of communications.

For the group member "Xiao Bai" who originally sent the communication message 133, the enterprise WeChat can provide a birthday reminder about the group member "Bai Bai", to cause the group member "Xiao Bai" to send the above communication message 133 according to the birthday reminder. Apparently, the birthday reminder can also be sent to other group members, and the enterprise WeChat can also send reminders about other content, such as anniversary reminders, etc., which are not limited in the present disclosure. Apparently, the enterprise WeChat can also provide other group members with a birthday reminder about the group member "Bai Bai".

Figure 16:
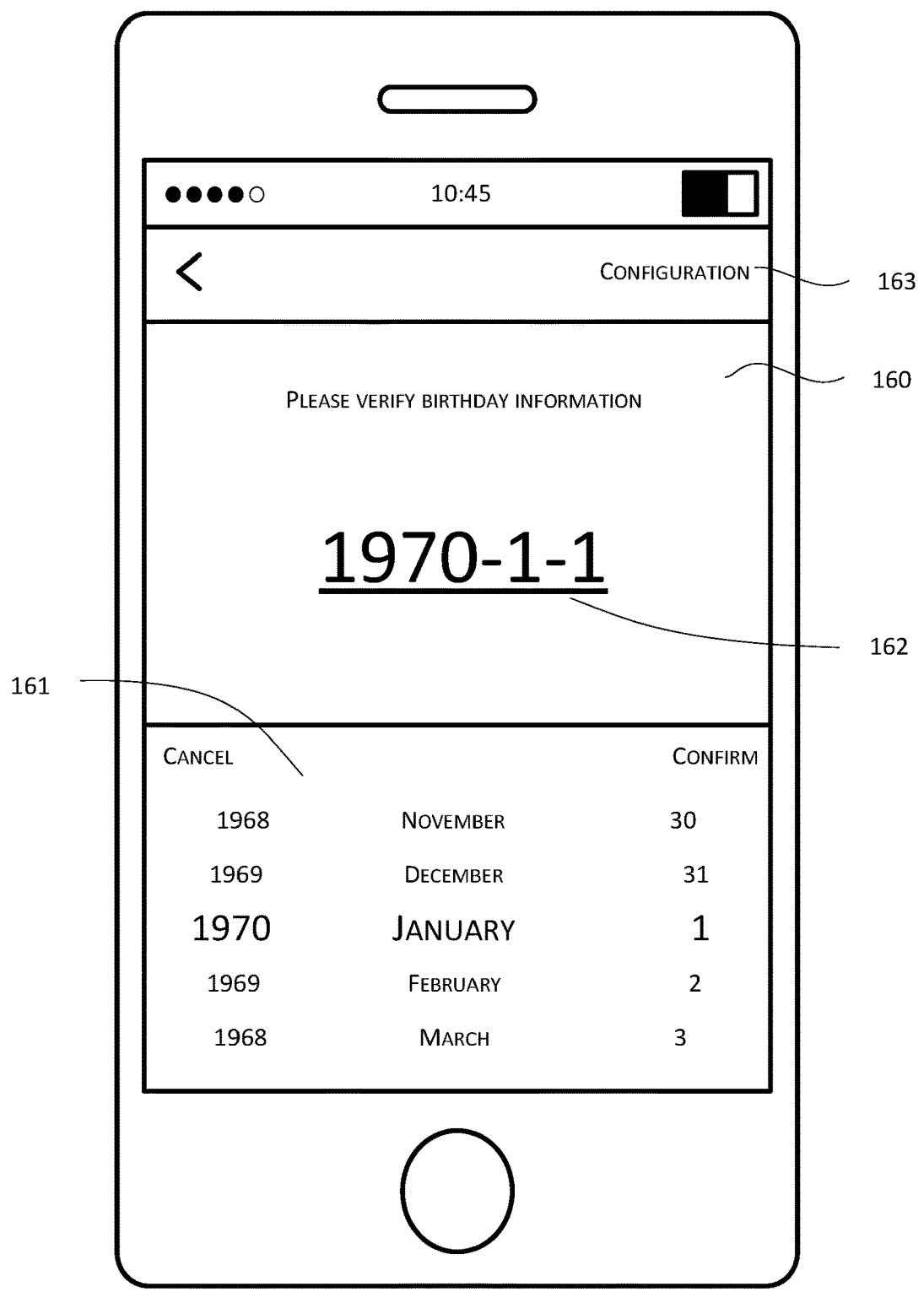
FIG. 16 is a schematic diagram of a page for setting birthday information according to an exemplary embodiment of the present disclosure.

In order to implement a birthday reminder about the group member "Bai Bai", the following operations need to be performed beforehand:

First, the enterprise WeChat needs to know birthday information of the group member "Bai Bai". The group member "Bai Bai" can set a corresponding birth date 162 through a date setting control 161 in a birthday information setting page 160 as shown in FIG. 16, and thereby the birthday information of the group member "Bai Bai" is known.

Figure 17:
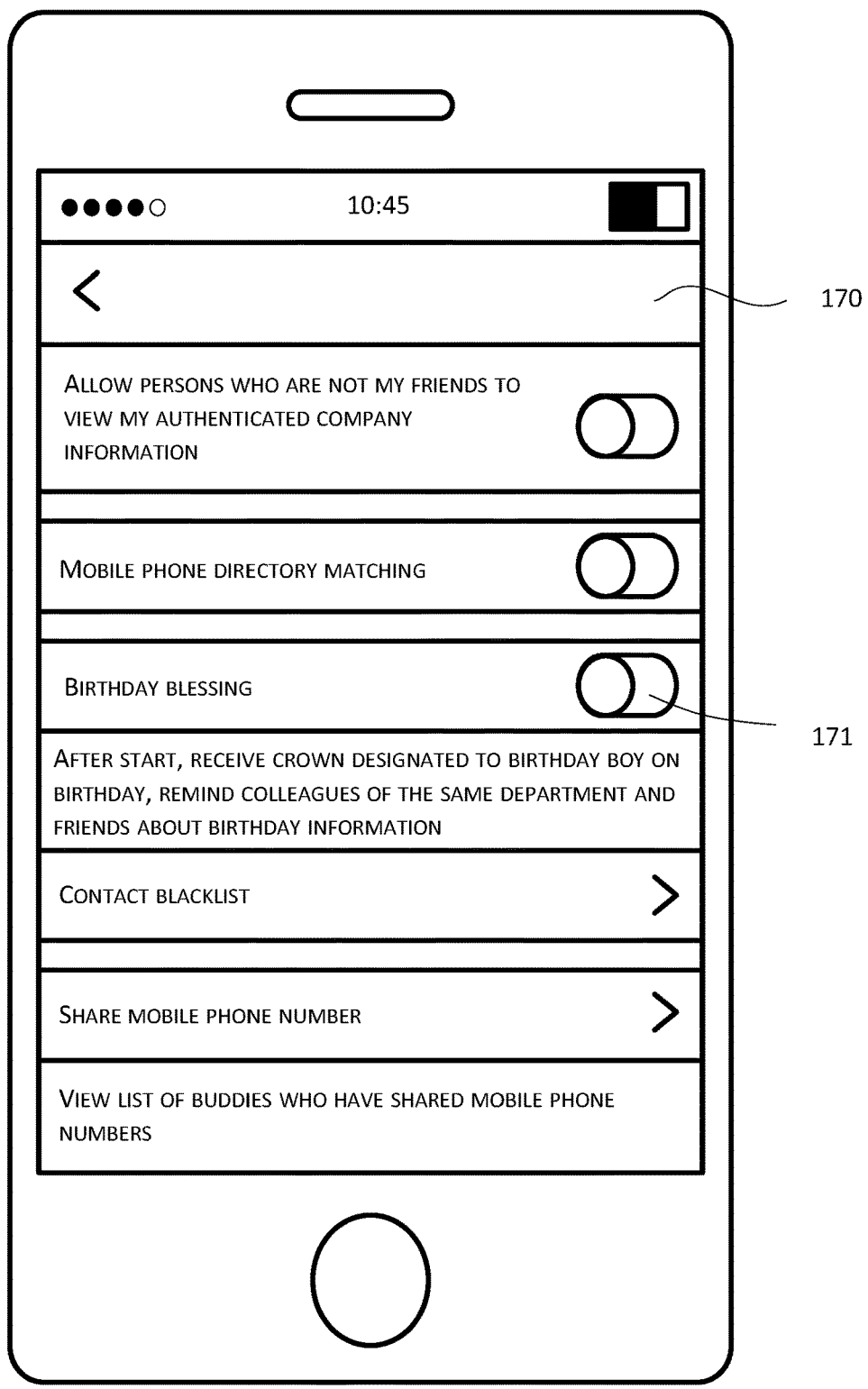
FIG. 17 is a schematic diagram of a page for setting a birthday blessing prompt function according to an exemplary embodiment of the present disclosure.

The group member "Bai Bai" then needs to open a function of "birthday blessing" (which also can be other names) on an enterprise WeChat client end thereof. For example, the group member "Bai Bai" can switch to a privacy setting page 170 as shown in FIG. 17 by triggering a setting option 163 in the birthday information setting page 160. As shown in FIG. 17, the privacy setting page 170 may include an on-off switch slider 171 of the function of "birthday blessing". When the on-off switch slider 171 is in a position as shown in FIG. 17, this indicates that the function of "birthday blessing" is off. When the group member "Bai Bai" slides the on-off switch slider 171 to the right, the function of "birthday blessing" is turned on.

In an embodiment as shown in FIG. 17, when the function of "birthday blessing" is turned on, a predefined prompting rule includes: prompting the birthday information to colleagues of the same department and friends. Because of possessing enterprise management attributes, the enterprise WeChat can learn information of an organization structure of each enterprise, and so can identify users who have relatively close relationships with the group member "Bai Bai", such as colleagues of the same department and friends, thus avoiding from sending the birthday information to users who are relatively unfamiliar therewith, such as colleagues from different departments and external contacts of other companies, etc. Apparently, in an embodiment, the group member "Bai Bai" can set the above-mentioned predefined reminder rule to ensure that the enterprise WeChat only pushes the birthday reminder to users desired by the group member "Bai Bai".

Figure 18:
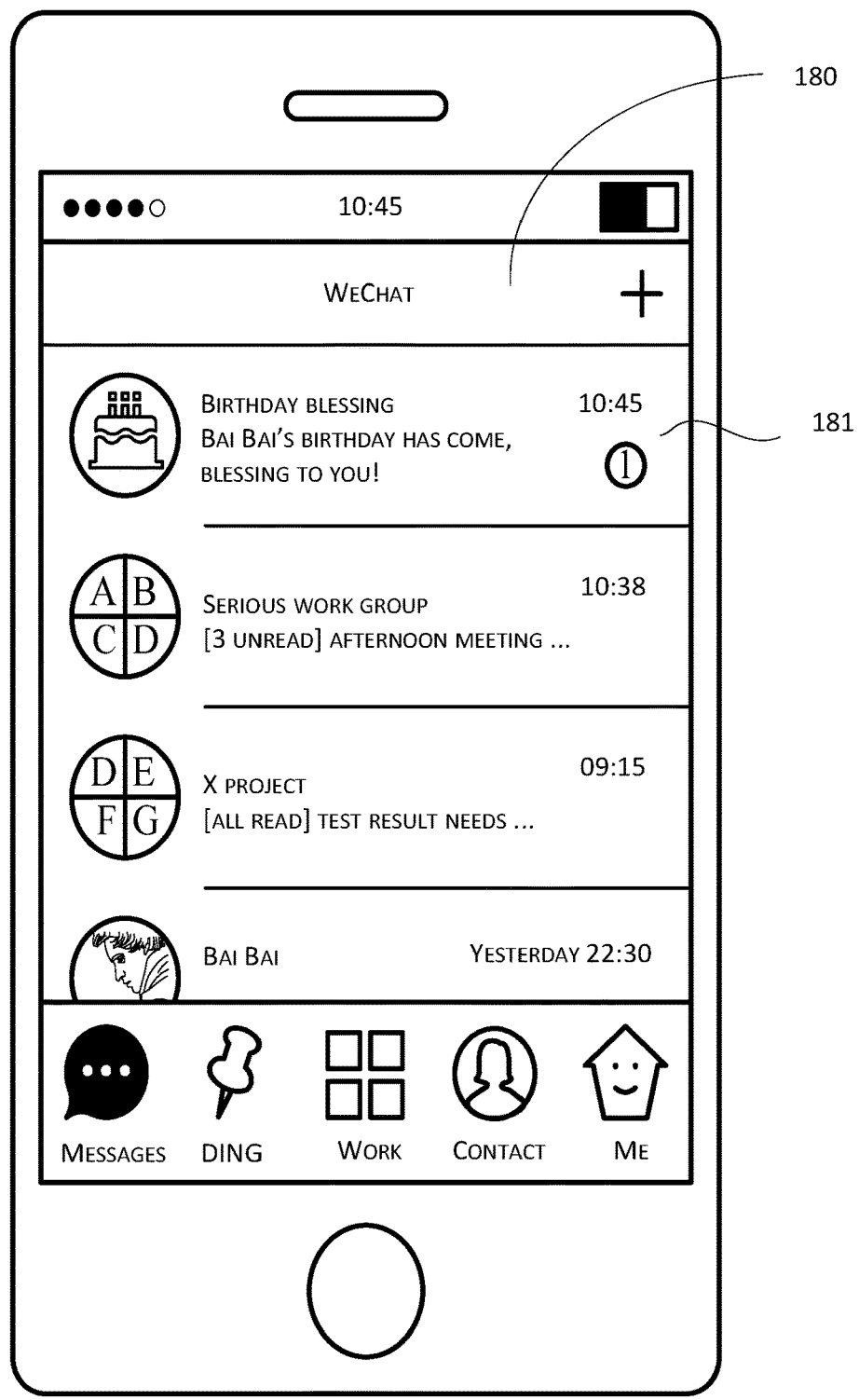
FIG. 18 is a schematic diagram of a page for receiving a birthday blessing prompt message according to an exemplary embodiment of the present disclosure.
Figure 19:
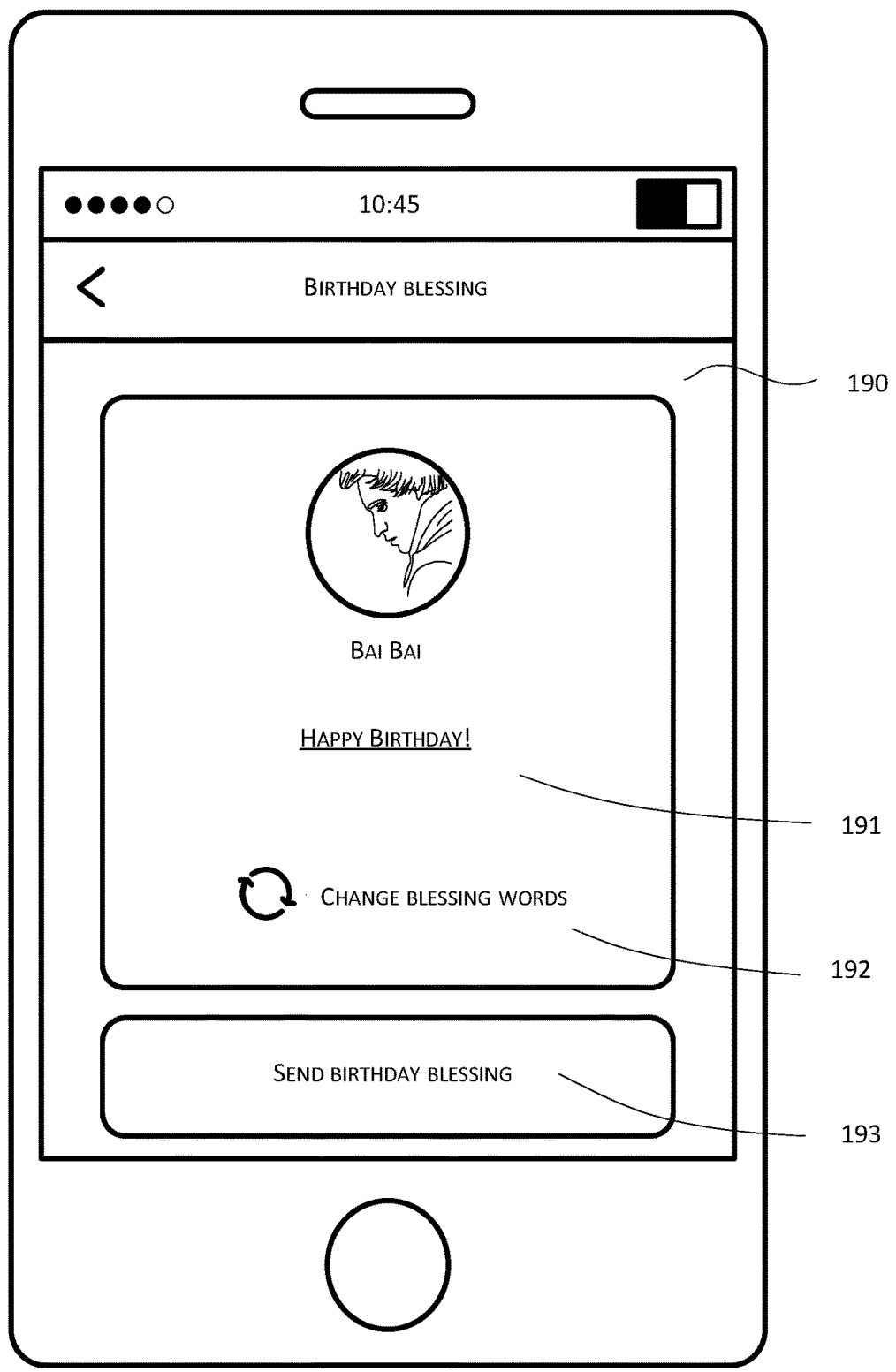
FIG. 19 is a schematic diagram of receiving a birthday blessing prompt page according to an exemplary embodiment of the present disclosure.

Based on the above operations, the enterprise WeChat server end running on the server 41 can push corresponding birthday reminder information to other group members of a group to which the group member "Bai Bai" belongs on the birthday thereof (or other times close to the birthday such as the night before). An enterprise WeChat client end of the group member "Xiao Bai" is used as an example. When the enterprise WeChat client end receives the birthday reminder information, the enterprise WeChat client end can display a page entry 181 in a session list page 180 as shown in FIG. 18, so that the group member "Xiao Bai" can enter a birthday blessing reminding page 190 as shown in FIG. 19 by triggering the page entry 181. Similar to receiving a prompt of an instant message, a display of a "①" icon in the page entry 181 can be used to indicate that a piece of birthday reminder information has not yet been read.

The birthday blessing reminder page 190 as shown in FIG. 19 includes information such as a head image and a name of the group member "Bai Bai" to indicate that the birthday reminder is initiated for the group member "Bai Bai". The birthday blessing reminder page 190 may further include birthday blessing information 191 for the group member "Bai Bai", and the birthday blessing information 191 is automatically generated by the enterprise WeChat. The group member "Xiao Bai" can trigger a switching option 192, to automatically switch the birthday blessing information 191, and send the birthday blessing information 191 to the group member "Bai Bai" by triggering a sending option 193. Apparently, the group member "Xiao Bai" can also manually edit the birthday blessing information 191 by triggering the birthday blessing information 191 or other means.

Message content of the birthday blessing information 191 that is automatically generated by the enterprise WeChat can satisfy at least one of the following conditions: 1) the message content conforms to a historical communication habit of the group member "Xiao Bai"; 2) the message content matches a status of relationship between the group member "Xiao Bai" and the group member "Bai Bai"; and 3) the message content matches a personal status of the group member "Bai Bai". The above conditions can be referenced to the foregoing text describing conditions when the enterprise WeChat configures a quick message matching a quick sending control, and details thereof are not redundantly described herein.

Figure 20:
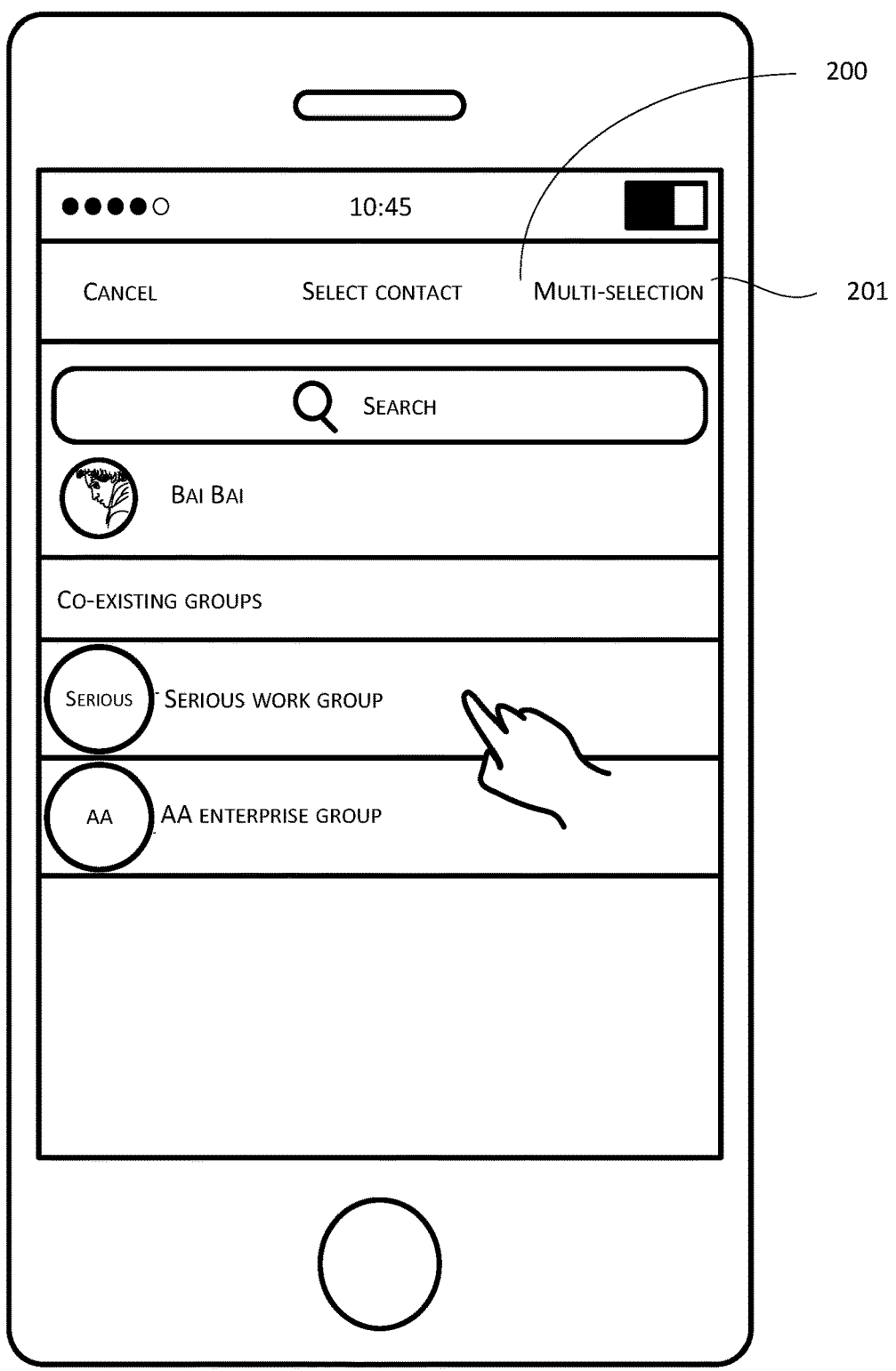
FIG. 20 is a schematic diagram of a page for selecting a sending object of a birthday blessing message according to an exemplary embodiment of the present disclosure.

In response to detecting that the group member "Xiao Bai" triggers the sending option 193, a switching to a contact selection page 200 as shown in FIG. 20 can be made. The group member "Xiao Bai" can select a separate target object to be sent to, and the individual target object can include the group member "Bai Bai", and may also include groups in which the group member "Xiao Bai" and the group member "Bai Bai" co-exist, such as the group "serious work group", the group "AA enterprise group", etc. The group member "Xiao Bai" can also select multiple target objects to be sent to by triggering a multi-selection button 201. In this case, when the group member "Xiao Bai" selects to send to the group "serious work group", enterprise WeChat client ends of other group members in the group can display a communication session page 80 such as the one as shown in FIG. 8, so that an enterprise WeChat client end can configure a quick message matching the quick sending control 82 by performing content recognition on the communication message 83, and details thereof are not repeatedly described herein.

Apparently, for the birthday blessing reminder page 190 as shown in FIG. 19, other content, such as a virtual resource, etc., may be sent in addition to the birthday blessing information 191. For example, the group member "Xiao Bai" can configure a red envelope through the birthday blessing reminder page 190, and allocate a virtual resource such as funds to the group member "Bai Bai" through the red envelope. When the red envelope is sent to the group, it needs to be ensured that the group member "Bai Bai" has or uniquely has the rights to be allocated with the corresponding virtual resource.

As can be seen from the above technical solutions, the present disclosure performs content recognition on a communication message in a communication session page, and configures a to-be-sent message corresponding to a message sending control accordingly, so that an end user only needs to trigger the message sending control to send the to-be-sent message that is similar to the communication message, without the need of manual input by the end user, thus helping to improve the efficiency of communications.

Figure 21:
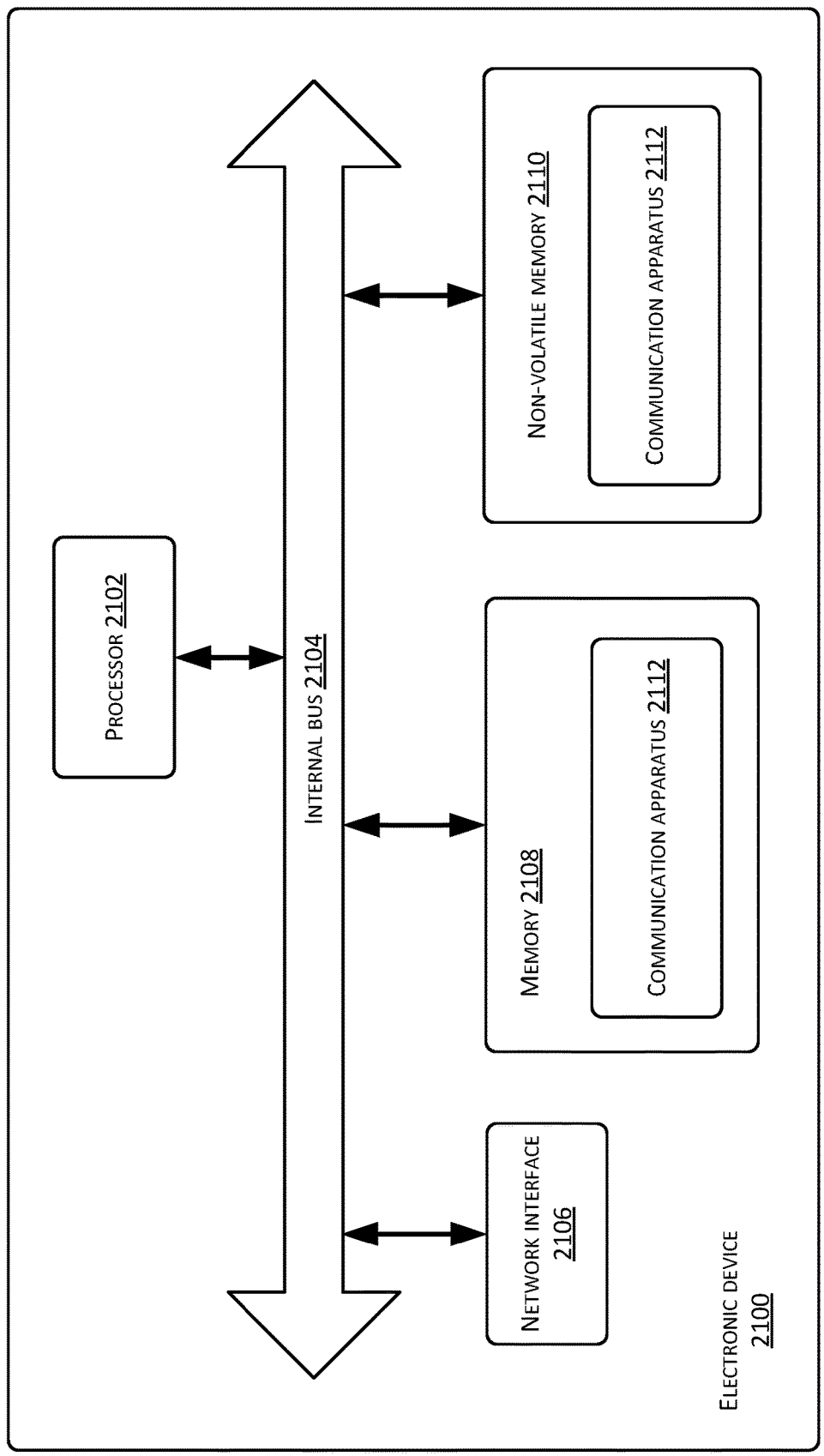
FIG. 21 is a schematic structural diagram of an electronic device according to an exemplary embodiment of the present disclosure.

FIG. 21 is a schematic structural diagram of an electronic device 2100 according to an exemplary embodiment of the present disclosure. Referring to FIG. 21, at a hardware level, the electronic device 2100 includes a processor 2102, an internal bus 2104, a network interface 2106, a memory 2108, and a non-volatile memory 2110. Apparently, hardware needed by other services may also be included. The processor 2102 reads a corresponding computer program from the non-volatile memory 2110 into the memory 2108, and then operates to form a communication apparatus 2112 at a logical level. Apparently, in addition to software implementations, the present disclosure does not exclude other manners of implementation, such as a logic device or a combination of software and hardware, etc. In other words, an execution body of the following flow of processing is not limited to each logical unit, and may be a hardware or logic device.

Figure 22:
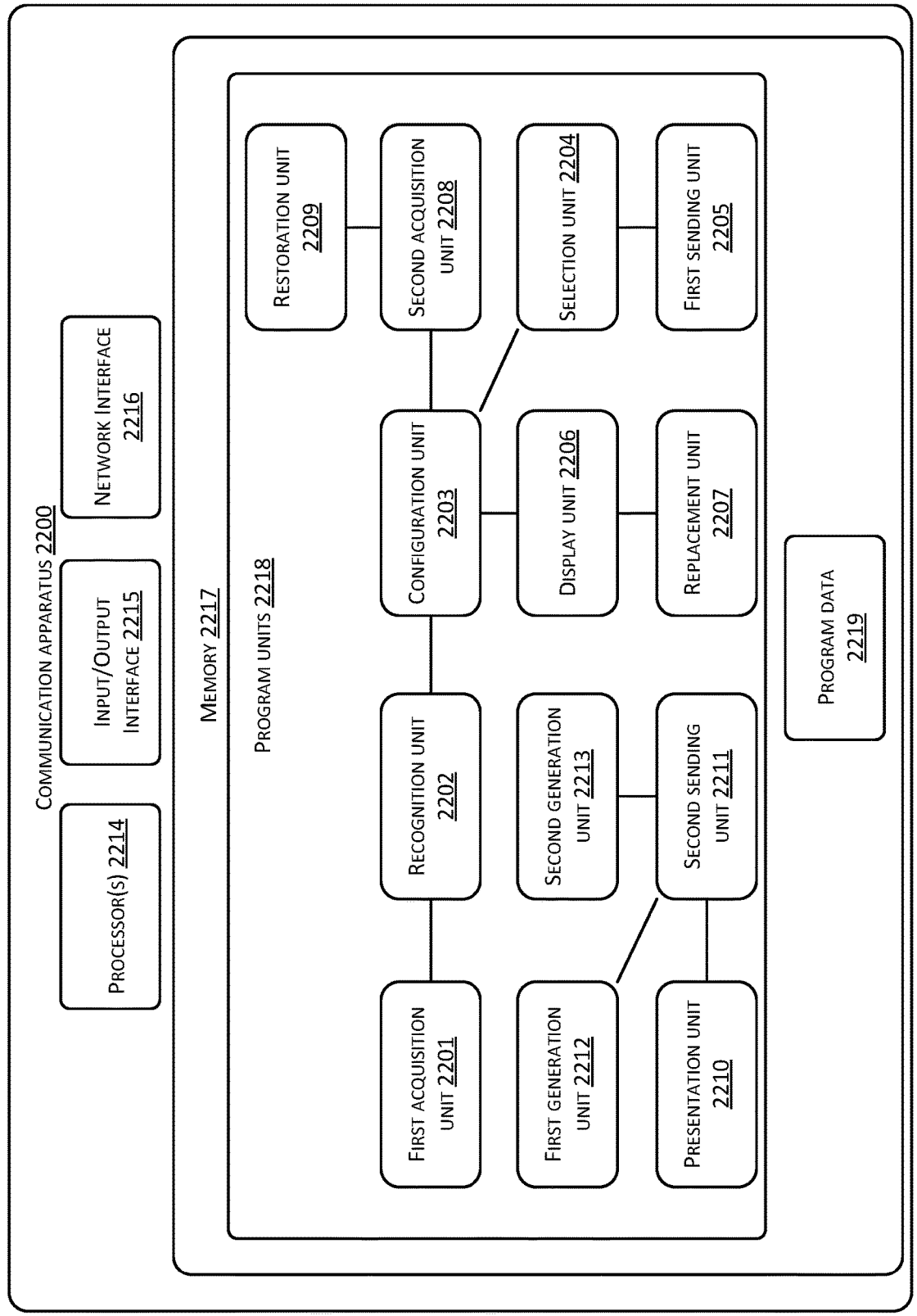
FIG. 22 is a block diagram of a communication apparatus according to an exemplary embodiment of the present disclosure.

Referring to FIG. 22, in implementations, a communication apparatus 2200 may include a first acquisition unit 2201, a recognition unit 2202, and a configuration unit 2203.

The first acquisition unit 2201 obtains a communication message in a communication session page when an end user communicates with at least one peer user based on a communication session page of a mobile enterprise office platform.

The recognition unit 2202 performs content recognition on the communication message.

The configuration unit 2203 configures a quick message corresponding to a quick sending control in the communication session page, so that the quick message matches a content recognition result for the communication message, wherein the quick message is quickly sent based on the communication session page when the quick sending control is triggered.

In implementations, the recognition unit 2202 is specifically configured to identify a described topic of the communication message; and the configuration unit 2203 is specifically configured to select a quick message that matches the described topic, and associate the selected quick message to the quick sending control.

In implementations, the recognition unit 2202 is specifically configured to identify a sender of the communication message as a separate notification object specified by the communication message when multiple peer users exist; and the configuration unit 2203 is specifically configured to add notification indication information for the separate notification object in the quick message corresponding to the quick sending control.

In implementations, the communication message meets at least one of the following conditions:

the communication message being located within a visible range of the user in the communication session page;

a difference between a sending time of the communication message and an obtaining time of the communication message being not greater than a preset time difference;

the sending time is in a same natural day as the obtaining time; and a number of messages in between the communication message and a most recent communication message being not greater than a preset number.

In implementations, the apparatus 2200 also includes:

a selection unit 2204 that selects a quick message from all quick messages that correspond to the quick sending control; and a first sending unit 2205 that quickly sends out the selected quick message through the communication session page according to a detected triggering operation for the quick sending control.

In implementations, the selection unit 2204 is specifically configured to:

randomly select a quick message corresponding to the quick sending control.

In implementations, message content of the selected quick message satisfies at least one of the following conditions:

the message content conforming to a historical communication habit of the end user;

the message content matching a status of relationship between the end user and a target communication object of the quick message; and the message content matching a personal status of the target communication object of the quick message.

In implementations, the apparatus 2200 also includes:

a display unit 2206 that displays preview content of the selected quick message when the triggering operation is maintained and continued; and a replacement unit 2207 that replaces the selected quick message if a canceling operation for the triggering operation is detected during a process of displaying the preview content.

In implementations, the message content of the quick message includes at least one of the following:

a text, a still picture, a dynamic picture, a file, and a virtual resource.

In implementations, the apparatus 2200 also includes:

a second acquisition unit 2208 that obtains first manual input content inputted and sent by the end user through an input box of the communication session page;

a restoration unit 2209 that restores the quick message corresponding to the quick sending control to initial content when the first manual input content matches the communication message.

In implementations, the apparatus 2200 also includes:

a presentation unit 2210 that presents a reminder page related to any associated user of the end user when a specific attribute of the any associated user meets a predefined prompting rule; and a second sending unit 2211 that sends a communication message for the any associated user in a group where the end user and the any associated user co-exist in response to detecting a triggering operation for the reminder page, message content of the communication message being related to the specific attribute.

In implementations, the any associated user is configured as a corresponding separate notification object in the communication message for the any associated user; or the any associated user has or uniquely has a right to be allocated with a virtual resource when the communication message for the any associated user is used to allocate the virtual resource.

In implementations, the apparatus 2200 further includes: a first generation unit 2212 or a second generation unit 2213.

The first generation unit 2212 generates a communication message for the any associated user according to second manual input content inputted by the end user.

The second generation unit 2213 selects predefined message content related to the specific attribute, and generates a communication message for the any associated user.

In implementations, the apparatus 2200 may further include one or more processors 2214, an input/output interface 2215, a network interface 2216, and a memory 2217.

The memory 2217 may include a form of computer readable media such as a volatile memory, a random access memory (RAM) and/or a non-volatile memory, for example, a read-only memory (ROM) or a flash RAM. The memory 2217 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 2217 may include program units 2218 and program data 2219. The program units 2218 may include one or more units as described in the foregoing description and FIG. 22.

Figure 23:
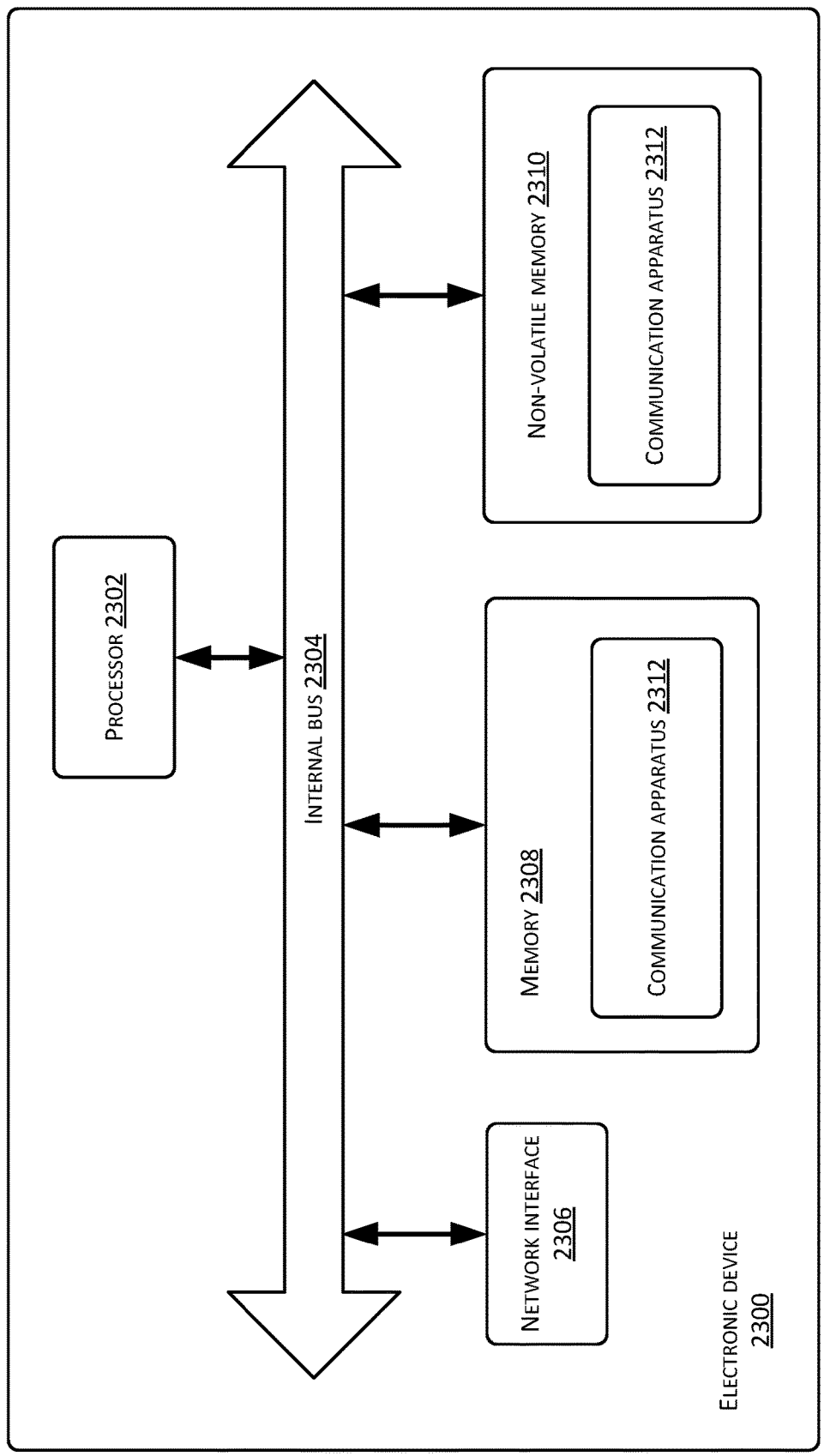
FIG. 23 is a schematic structural diagram of another electronic device according to an exemplary embodiment of the present disclosure.

FIG. 23 is a schematic structural diagram of an electronic device 2300 according to an exemplary embodiment of the present disclosure. Referring to FIG. 23, at a hardware level, the electronic device 2300 includes a processor 2302, an internal bus 2304, a network interface 2306, a memory 2308, and a non-volatile memory 2310. Apparently, hardware needed by other services may also be included. The processor 2302 reads a corresponding computer program from the non-volatile memory 2310 into the memory 2308, and then operates to form a communication apparatus 2312 at a logical level. Apparently, in addition to software implementations, the present disclosure does not exclude other manners of implementation, such as a logic device or a combination of software and hardware, etc. In other words, an execution body of the following flow of processing is not limited to each logical unit, and may be a hardware or logic device.

Figure 24:
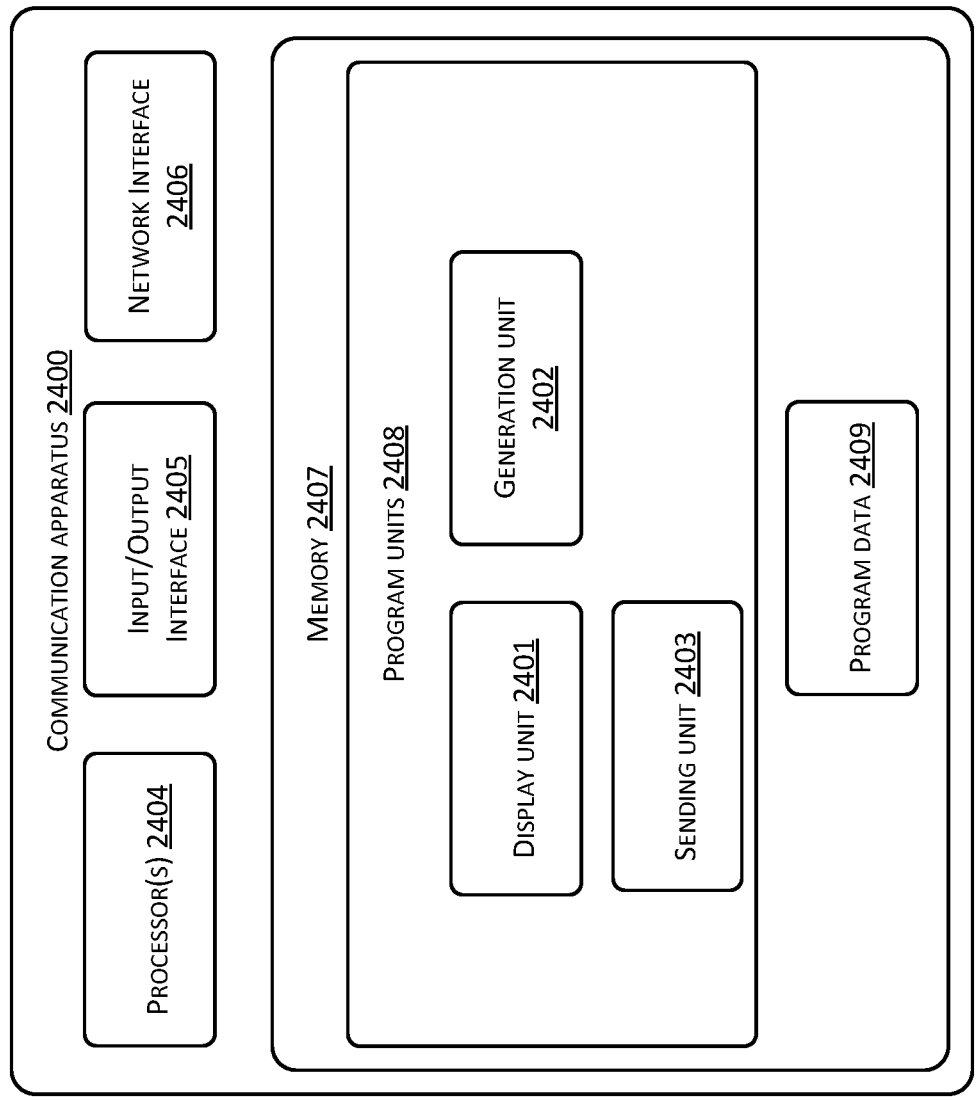
FIG. 24 is a block diagram of another communication apparatus according to an exemplary embodiment of the present disclosure.

Referring to FIG. 24, in implementations, a communication apparatus 2400 may include a display unit 2401, a generation unit 2402, and a sending unit 2403.

The display unit 2401 displays a quick sending control in a communication session page of an end user and at least one peer user that is based on a mobile enterprise office platform.

The generation unit 2402 randomly generates a quick message corresponding to a quick sending control in response to detecting a triggering operation for the quick sending control.

The sending unit 2403 quickly sends the generated quick message through the communication session page.

In implementations, message content of the generated quick message satisfies at least one of the following conditions:

the message content conforming to a historical communication habit of the end user;

the message content matching a status of relationship between the end user and a target communication object of the quick message; and the message content matching a personal status of the target communication object of the quick message.

In implementations, the apparatus 2400 may further include one or more processors 2404, an input/output interface 2405, a network interface 2406, and a memory 2407. The memory 2407 may include a form of computer readable media as described in the foregoing description.

In implementations, the memory 2407 may include program units 2408 and program data 2409. The program units 2408 may include one or more units as described in the foregoing description and FIG. 24.

The systems, apparatuses, modules, or units illustrated in the above embodiments may be implemented by a computer chip or an entity, or by a product having certain function(s). A typical device of implementation is a computer, and a specific form of the computer may be a personal computer, a laptop computer, a cellular phone, a camera phone, a smart phone, a personal digital assistant, a media player, a navigation device, an email transceiver, and a game control, a tablet computer, a wearable device, or any combination of these devices.

In a typical configuration, a computer includes one or more processors (CPUs), an input/output interface, a network interface, and a memory.

It is also noted that terms "include", "contain" or any other variations are intended to encompass a non-exclusive inclusion, such that a process, method, product, or device that includes a series of elements not only includes these elements, but also includes other elements that are not explicitly listed, or also includes elements that are inherent to such process, method, product, or device. Without further limitation, an element that is defined by a phrase "comprising a . . . " does not exclude the presence of other identical elements in a process, method, product, or device that includes the element.

Exemplary embodiments are described in detail herein, and examples thereof are illustrated in the accompanying drawings. When the accompanying drawings are involved in the following description, same or similar numbers in different figures represent same or similar elements, unless indicated otherwise. Implementations described in the following exemplary embodiments do not represent all the embodiments that are consistent with the present disclosure. Instead, they are merely examples of apparatuses and methods that are consistent with some aspects of the present disclosure as detailed in the appended claims.

Terminologies used in the present disclosure are merely for the purpose of describing particular embodiments, and are not intended to limit the present disclosure. Singular forms "a", "said" and "the" are intended to include plural forms, unless stated clearly in the context otherwise. It should also be understood that a term "and/or" used herein refers to and includes any or all possible combinations of one or more of associated items that are listed.

It should be understood that, although terms such as first, second, third, etc. may be used in the present disclosure to describe various types of information, these pieces of information should not be limited to these terms. These terms are merely used for distinguishing information of the same type. For example, without departing from the scope of the present disclosure, first information may also be referred to as second information, and similarly, the second information may also be referred to as the first information. Depending on the context, a term "if" used herein may be interpreted as "when" or "in an event of" or "in response to determining".

The above description merely corresponds to exemplary embodiments of the present disclosure, and is not intended to limit the present disclosure. Any modifications, equivalent replacements, improvements, etc. that are made within the spirit and principles of the present disclosure are included in the scope of protection of the present disclosure.

The present disclosure can be further understood using the following clauses.

Clause 1: A communication method comprising: obtaining at least a part of a communication message in a communication session page of a communication application, the communication session page being used for conducting communications between an end user and at least one peer user; performing content recognition of the communication message; and configuring a to-be-sent message corresponding to a message sending control in the communication session page, so that the to-be-sent message matches a content recognition result for the communication message.

Clause 2: The method of Clause 1, wherein the message sending control comprises a quick sending control in the communication session page, and the to-be-sent message is quickly sent to the at least one peer user when the quick sending control is triggered.

Clause 3: The method of Clause 1, wherein: performing the content recognition of the communication message comprises identifying a described topic of the communication message; and configuring the to-be-sent message corresponding to the message sending control in the communication session page comprises selecting a to-be-sent message matching the described topic, and associating the selected to-be-sent message to the message sending control.

Clause 4: The method of Clause 1, wherein: performing the content recognition of the communication message comprises identifying a sender of the communication message as a separate notification object specified by the communication message when multiple peer users exist; and configuring the to-be-sent message corresponding to the message sending control in the communication session page comprises adding notification indication information for the separate notification object in the to-be-sent message corresponding to the message sending control.

Clause 5: The method of Clause 1, wherein the communication message satisfies at least one of the following conditions: the communication message being located within a visible range of the user in the communication session page; a difference between a sending time of the communication message and an obtaining time of the communication message being not greater than a preset time difference; the sending time is in a same natural day as the obtaining time; and a number of messages in between the communication message and a most recent communication message being not greater than a preset number.

Clause 6: The method of Clause 1, further comprising: selecting the to-be-sent message from among all to-be-sent messages that correspond to the quick sending control; and quickly sending out the selected to-be-sent message through the communication session page according to a detected triggering operation for the message sending control.

Clause 7: The method of Clause 6, wherein selecting the to-be-sent message comprises: randomly selecting a to-be-sent message corresponding to the message sending control.

Clause 8: The method of Clause 6, wherein message content of the selected to-be-sent message satisfies at least one of the following conditions: the message content conforming to a historical communication habit of the end user; the message content matching a status of relationship between the end user and a target communication object of the to-be-sent message; and the message content matching a personal status of the target communication object of the to-be-sent message.

Clause 9: The method of Clause 6, further comprising: displaying preview content of the selected to-be-sent message when the triggering operation is maintained and continued; and replacing the selected to-be-sent message if a canceling operation for the triggering operation is detected during a process of displaying the preview content.

Clause 10: The method of Clause 1, wherein message content of the to-be-sent message comprises at least one of the following: a text, a still picture, a dynamic picture, a file, and a virtual resource.

Clause 11: The method of Clause 1, further comprising: obtaining first manual input content inputted and sent by the end user through an input box of the communication session page; and restoring the to-be-sent message corresponding to the message sending control to initial content when the first manual input content matches the communication message.

Clause 12: The method of Clause 1, further comprising: presenting a reminder page related to any associated user of the end user when a specific attribute of the any associated user meets a predefined prompting rule; and sending a communication message for the any associated user in a group where the end user and the any associated user co-exist in response to detecting a triggering operation for the reminder page, message content of the communication message being related to the specific attribute.

Clause 13: The method of Clause 12, wherein: the any associated user is configured as a corresponding separate notification object in the communication message for the any associated user; or the any associated user has or uniquely has a right to be allocated with a virtual resource when the communication message for the any associated user is used to allocate the virtual resource.

Clause 14: The method of Clause 12, further comprising: generating the communication message for the any associated user according to second manual input content inputted by the end user; or selecting predefined message content related to the specific attribute, and generating the communication message for the any associated user.

Clause 15: A communication method comprising: displaying a quick sending control in a communication session page of an end user and at least one peer user that is based on an communication application; randomly generating a quick message corresponding to the quick sending control in response to detecting a triggering operation of the quick sending control; and quickly sending the generated quick message through the communication session page.

Clause 16: The method of Clause 15, wherein message content of the generated quick message satisfies at least one of the following conditions: the message content conforming to a historical communication habit of the end user; the message content matching a status of relationship between the end user and a target communication object of the quick message; and the message content matching a personal status of the target communication object of the quick message.

Clause 17: A communication apparatus comprising: a first acquisition unit that obtains a communication message in a communication session page when an end user communicates with at least one peer user based on a communication session page of a mobile enterprise office platform; a recognition unit that performs content recognition on the communication message; and a configuration unit that configures a to-be-sent message corresponding to a message sending control in the communication session page, so that the to-be-sent message matches a content recognition result for the communication message.

Clause 18: The apparatus of Clause 17, wherein the message sending control comprises a quick sending control in the communication session page, and the to-be-sent message is quickly sent to the at least one peer user when the quick sending control is triggered.

Clause 19: The apparatus of Clause 17, wherein: the recognition unit is specifically configured to identify a described topic of the communication message; and the configuration unit is specifically configured to select a to-be-sent message that matches the described topic, and associate the selected to-be-sent message to the message sending control.

Clause 20: The apparatus of Clause 17, wherein: the recognition unit is specifically configured to identify a sender of the communication message as a separate notification object specified by the communication message when multiple peer users exist; and the configuration unit is specifically configured to add notification indication information for the separate notification object in the to-be-sent message corresponding to the message sending control.

Clause 21: The apparatus of Clause 17, wherein the communication message meets at least one of the following conditions: the communication message being located within a visible range of the user in the communication session page; a difference between a sending time of the communication message and an obtaining time of the communication message being not greater than a preset time difference; the sending time is in a same natural day as the obtaining time; and a number of messages in between the communication message and a most recent communication message being not greater than a preset number.

Clause 22: The apparatus of Clause 17, further comprising: a selection unit that selects the to-be-sent message from among all to-be-sent messages that correspond to the message sending control; and a first sending unit that quickly sends out the selected to-be-sent message through the communication session page according to a detected triggering operation for the message sending control.

Clause 23: The apparatus of Clause 22, wherein the selection unit is specifically configured to: randomly select a to-be-sent message corresponding to the message sending control.

Clause 24: The apparatus of Clause 22, wherein message content of the selected to-be-sent message satisfies at least one of the following conditions: the message content conforming to a historical communication habit of the end user; the message content matching a status of relationship between the end user and a target communication object of the to-be-sent message; and the message content matching a personal status of the target communication object of the to-be-sent message.

Clause 25: The apparatus of Clause 22, further comprising: a display unit that displays preview content of the selected to-be-sent message when the triggering operation is maintained and continued; and a replacement unit that replaces the selected to-be-sent message if a canceling operation for the triggering operation is detected during a process of displaying the preview content.

Clause 26: The apparatus of Clause 17, wherein the message content of the to-be-sent message includes at least one of the following: a text, a still picture, a dynamic picture, a file, and a virtual resource.

Clause 27: The apparatus of Clause 17, further comprising: a second acquisition unit that obtains first manual input content inputted and sent by the end user through an input box of the communication session page; and a restoration unit that restores the to-be-sent message corresponding to the message sending control to initial content when the first manual input content matches the communication message.

Clause 28: The apparatus of Clause 17, further comprising: a presentation unit that presents a reminder page related to any associated user of the end user when a specific attribute of the any associated user meets a predefined prompting rule; and a second sending unit that sends a communication message for the any associated user in a group where the end user and the any associated user co-exist in response to detecting a triggering operation for the reminder page, message content of the communication message being related to the specific attribute.

Clause 29: The apparatus of Clause 28, wherein: the any associated user is configured as a corresponding separate notification object in the communication message for the any associated user; or the any associated user has or uniquely has a right to be allocated with a virtual resource when the communication message for the any associated user is used to allocate the virtual resource.

Clause 30: The apparatus of Clause 28, further comprising: a first generation unit or a second generation unit, wherein: the first generation unit generates a communication message for the any associated user according to second manual input content inputted by the end user; and the second generation unit selects predefined message content related to the specific attribute, and generates a communication message for the any associated user.

Clause 31: A communication apparatus comprising: a display unit that displays a quick sending control in a communication session page of an end user and at least one peer user that is based on a mobile enterprise office platform; a generation unit that randomly generates a quick message corresponding to a quick sending control in response to detecting a triggering operation for the quick sending control; and a sending unit that quickly sends the generated quick message through the communication session page.

Clause 32: The apparatus of Clause 21, wherein message content of the generated quick message satisfies at least one of the following conditions: the message content conforming to a historical communication habit of the end user; the message content matching a status of relationship between the end user and a target communication object of the quick message; and the message content matching a personal status of the target communication object of the quick message.

What is claimed is:

1. A method implemented by a computing device, the method comprising:
   obtaining at least a part of a communication message in a communication session page of a communication application;
   performing a content recognition of the communication message;
   configuring a to-be-sent message for a message sending control in the communication session page, wherein the to-be-sent message matches a content recognition result for the communication message;
   obtaining a first manual input content inputted and sent by an end user through an input box of the communication session page; and
   restoring the to-be-sent message for the message sending control to an initial content in response to determining that the first manual input content matches the communication message.

2. The method of claim 1, wherein the message sending control comprises a quick sending control in the communication session page, and the to-be-sent message is sent to at least one peer user when the quick sending control is triggered.

3. The method of claim 1, wherein:
   the performing the content recognition of the communication message comprises identifying a described topic of the communication message; and
   the configuring the to-be-sent message for the message sending control in the communication session page comprises selecting the to-be-sent message matching the described topic, and associating the selected to-be-sent message to the message sending control.

4. The method of claim 1, wherein:
   the performing the content recognition of the communication message comprises identifying a sender of the communication message as a separate notification object specified by the communication message when multiple peer users exist; and
   the configuring the to-be-sent message for the message sending control in the communication session page comprises adding notification indication information for the separate notification object in the to-be-sent message for the message sending control.

5. The method of claim 1, wherein the communication message satisfies at least one of:
   the communication message being located within a visible range of the end user in the communication session page;
   a difference between a sending time of the communication message and an obtaining time of the communication message being not greater than a preset time difference;
   the sending time is in a same natural day as the obtaining time; and
   a number of messages in between the communication message and a most recent communication message being not greater than a preset number.

6. The method of claim 1, further comprising:
   selecting the to-be-sent message from among all to-be-sent messages that correspond to the quick sending control; and
   quickly sending out the selected to-be-sent message through the communication session page according to a detected triggering operation for the message sending control.

7. The method of claim 6, wherein the selecting the to-be-sent message comprises: randomly selecting the to-be-sent message for the message sending control.

8. The method of claim 6, wherein a message content of the selected to-be-sent message satisfies at least one of:
   the message content conforming to a historical communication habit of the end user;
   the message content matching a status of relationship between the end user and a target communication object of the to-be-sent message; and
   the message content matching a personal status of the target communication object of the to-be-sent message.

9. The method of claim 6, further comprising:
   displaying a preview content of the selected to-be-sent message when the triggering operation is maintained and continued; and
   replacing the selected to-be-sent message in response to determining that a canceling operation for the triggering operation is detected during a process of displaying the preview content.

10. The method of claim 1, wherein a message content of the to-be-sent message comprises at least one of:
    a text, a still picture, a dynamic picture, a file, and a virtual resource.

11. The method of claim 1, further comprising:
    presenting a reminder page related to any associated user of the end user when a specific attribute of the any associated user meets a predefined prompting rule; and
    sending a communication message for the any associated user in a group where the end user and the any associated user co-exist in response to detecting a triggering operation for the reminder page, a message content of the communication message being related to the specific attribute.

12. The method of claim 11, wherein:
    the any associated user is configured as a corresponding separate notification object in the communication message for the any associated user; or
    the any associated user has or uniquely has a right to be allocated with a virtual resource when the communication message for the any associated user is used to allocate the virtual resource.

13. The method of claim 11, further comprising:
    generating the communication message for the any associated user according to second manual input content inputted by the end user; or
    selecting predefined message content related to the specific attribute, and generating the communication message for the any associated user.

14. One or more computer readable media storing executable instructions that, when executed by one or more processors, cause the one or more processors to perform acts comprising:
    displaying a quick sending control in a communication session page of an end user and at least one peer user that is based on a communication application;

obtaining at least a part of a communication message in the communication session page of the communication application;

generating a quick message corresponding to the quick sending control; and obtaining a first manual input content inputted and sent by an end user through an input box of the communication session page; and restoring the quick message corresponding to the quick sending control to an initial content in response to determining that the first manual input content matches the communication message.

15. The one or more computer readable media of claim 14, wherein a message content of the generated quick message further satisfies at least one of:

the message content conforming to a historical communication habit of the end user;

the message content matching a status of relationship between the end user and a target communication object of the quick message; and the message content matching a personal status of the target communication object of the quick message.

16. An apparatus comprising:

one or more processors; and one or more memories storing executable instructions that, when executed by one or more processors, cause the one or more processors to perform acts comprising:

obtaining at least a part of a communication message in a communication session page in response to determining that an end user communicates with at least one peer user based on the communication session page of a mobile enterprise office platform;

performing a content recognition on the communication message;

configuring a to-be-sent message for a message sending control in the communication session page, so that the to-be-sent message matches a content recognition result for the communication message;

obtaining a first manual input content inputted and sent by an end user through an input box of the communication session page; and restoring the to-be-sent message for the message sending control to an initial content in response to determining that the first manual input content matches the communication message.

17. The apparatus of claim 16, wherein the message sending control comprises a quick sending control in the communication session page, and the to-be-sent message is sent to the at least one peer user when the quick sending control is triggered.

18. The apparatus of claim 16, wherein:

the performing the content recognition of the communication message comprises identifying a described topic of the communication message; and the configuring the to-be-sent message for the message sending control in the communication session page comprises selecting the to-be-sent message that matches the described topic, and associating the selected to-be-sent message to the message sending control.

19. The apparatus of claim 16, wherein:

the performing the content recognition of the communication message comprises identifying a sender of the communication message as a separate notification object specified by the communication message when multiple peer users exist; and the configuring the to-be-sent message for the message sending control in the communication session page comprises adding notification indication information for the separate notification object in the to-be-sent message for the message sending control.

20. The method of claim 1, wherein the restoring the to-be-sent message for the message sending control to an initial content in response to determining that the first manual input content matches the communication message comprises:

sending the first manual input content;

determining that the end user does not want to send the to-be-sent message; and restoring the to-be-sent message for the message sending control to the initial content.

\* \* \* \* \*